US006175706B1

(12) United States Patent
Watanabe et al.

(10) Patent No.: US 6,175,706 B1
(45) Date of Patent: *Jan. 16, 2001

(54) PROCESS CARTRIDGE, ELECTROPHOTOGRAPHIC IMAGE FORMING APPARATUS DRIVING FORCE TRANSMISSION PART AND ELECTROPHOTOGRAPHIC PHOTOSENSITIVE DRUM

(75) Inventors: Kazushi Watanabe, Mishima; Yoshihiro Ito, Shizuoka-ken; Toshiharu Kawai, Susono, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/938,891

(22) Filed: Sep. 26, 1997

(30) Foreign Application Priority Data

| Sep. 26, 1996 | (JP) | 8-277530 |
| Dec. 24, 1996 | (JP) | 8-356297 |
| Sep. 16, 1997 | (JP) | 9-269320 |
| Sep. 25, 1997 | (JP) | 9-259995 |

(51) Int. Cl.[7] ............................ G03G 15/00; G03G 21/16
(52) U.S. Cl. ............................ 399/167; 399/111
(58) Field of Search .................. 399/111, 110, 399/167, 119

(56) References Cited

U.S. PATENT DOCUMENTS

| 3,213,719 | 10/1965 | Kloack . |
| 4,454,922 | 6/1984 | Jamison et al. ............ 175/323 |
| 4,607,734 | 8/1986 | Watashi et al. ............ 192/69 R |
| 4,829,335 | 5/1989 | Kanemitsu et al. . |
| 4,975,743 | 12/1990 | Surti . |

(List continued on next page.)

FOREIGN PATENT DOCUMENTS

| 0 115 315 | 8/1984 | (EP) . |
| 0 251 693 | 1/1988 | (EP) . |
| 0 586 041 | 3/1994 | (EP) . |
| 0 622 696 | 11/1994 | (EP) . |
| 0 735 432 | 10/1996 | (EP) . |
| 2 214 609 | 9/1989 | (GB) . |
| 4-282681 | 10/1992 | (JP) . |
| 6-83251 | 3/1994 | (JP) . |

*Primary Examiner*—Susan S. Y. Lee
(74) *Attorney, Agent, or Firm*—Fitzpatrick, Cella, Harper & Scinto

(57) ABSTRACT

A process cartridge detachably mountable to a main assembly of an electrophotographic image forming apparatus includes a motor, a main assembly side gear for receiving a driving force from the motor and a main assembly recess defined by a twisted surface. The main assembly recess is substantially coaxial with the gear, and a main assembly projection provided in the main assembly and substantially coaxial with the gear. The process cartridge includes an electrophotographic photosensitive drum; a process device actable on the photosensitive drum; and a twisted cartridge projection engageable with the twisted surfaces. The projection is provided at a longitudinal end of the photosensitive drum. The cartridge also includes a cartridge recess provided at a free end of the cartridge projection and substantially coaxial with the cartridge projection. When the process cartridge is mounted to the main assembly, the main assembly projection enters the cartridge recess. When the main assembly side gear rotates with the main assembly recess and cartridge projection engaged with each other, a rotational driving force is transmitted from the gear to the photosensitive drum through engagement between the main assembly recess and the cartridge projection.

69 Claims, 23 Drawing Sheets

U.S. PATENT DOCUMENTS

| | | |
|---|---|---|
| 5,019,861 | 5/1991 | Surti . |
| 5,023,660 | 6/1991 | Ebata et al. . |
| 5,095,335 | 3/1992 | Watanabe et al. . |
| 5,151,734 | 9/1992 | Tsuda et al. . |
| 5,223,893 | 6/1993 | Ikemoto et al. . |
| 5,280,224 | 1/1994 | Sagara .................................. 318/265 |
| 5,331,372 | 7/1994 | Tsuda et al. . |
| 5,345,294 | 9/1994 | Nomura et al. . |
| 5,353,100 | 10/1994 | Ohtsuka . |
| 5,404,198 | 4/1995 | Noda et al. . |
| 5,436,699 | 7/1995 | Komaki . |
| 5,452,064 | 9/1995 | Inomata . |
| 5,463,446 | 10/1995 | Watanabe et al. . |
| 5,465,136 | 11/1995 | Watanabe . |
| 5,475,470 | 12/1995 | Sasago et al. . |
| 5,488,459 | 1/1996 | Tsuda et al. . |
| 5,510,878 | 4/1996 | Noda et al. . |
| 5,602,623 | 2/1997 | Nishibata et al. ................... 399/111 |
| 5,768,656 * | 6/1998 | Nagasue et al. ................ 399/167 X |
| 5,903,803 * | 5/1999 | Kawai et al. ..................... 399/111 X |
| 5,926,673 * | 7/1999 | Foster et al. ......................... 399/167 |
| 6,006,058 * | 12/1999 | Watanabe et al. ................... 399/167 |
| 6,029,032 * | 2/2000 | Watanabe et al. ................... 399/111 |
| 6,035,159 * | 3/2000 | Azuma et al. ....................... 399/111 |

* cited by examiner (a)

(b)

PROCESS CARTRIDGE, ELECTROPHOTOGRAPHIC IMAGE FORMING APPARATUS DRIVING FORCE TRANSMISSION PART AND ELECTROPHOTOGRAPHIC PHOTOSENSITIVE DRUM

FIELD OF THE INVENTION AND RELATED ART

The present invention relates to a process cartridge, an electrophotographic image forming apparatus, a driving force transmission part and electrophotographic photosensitive drum. Here, the term electrophotographic image forming apparatus refers to an apparatus using an electrophotographic image formation type process to form an image on a recording medium. Examples of the electrophotographic image forming apparatus include a electrophotographic copying machine, a electrophotographic printer (laser beam printer, LED printer or the like), a facsimile device and a word processor.

Here, the term process cartridge may refer to a cartridge which is detachably mountable to a main assembly of an image forming apparatus and which contains as an unit an electrophotographic photosensitive member and at least one one of process means such as charging means, developing means, cleaning means or the like. The process cartridge may be a cartridge which is detachably mountable to a main assembly of an image forming apparatus and which contains as an unit an electrophotographic photosensitive member and a process means such as charging means, developing means, cleaning means or the like. The process cartridge may be a cartridge which is detachably mountable to a main assembly of an image forming apparatus and which contains as an unit an electrophotographic photosensitive member and developing means. Since the process cartridge is detachably mountable relative to the main assembly of the device, the maintenance of the device is easy.

An electrophotographic image forming apparatus using the electrophotographic image formation type is such that a latent image is formed by selectively exposing the electrophotographic photosensitive member uniformly charged by charging means to image information light. The latent image is developed with toner by a developing means into a toner image. The toner image thus formed is transferred onto a recording medium by transferring means to form an image on the recording material.

Various methods have been proposed to rotate the electrophotographic photosensitive drum.

In one method, as disclosed in in U.S. Pat. No. 5,023,660, pins fixed on a side surface of the gear provided on the main assembly are engaged with recesses formed in a side surface of a gear provided in the photosensitive drum, by which the photosensitive drum is rotated.

In another method, as disclosed in in U.S. Pat. No. 4,829,335, a helical gear provided in the main assembly and the helical gear provided on the photosensitive drum, are engaged to rotate the photosensitive drum.

These methods are both very effective for transmitting the rotation force to the photosensitive drum. The present invention is a further and fundamental improvement of the conventional methods and structures.

SUMMARY OF THE INVENTION

Accordingly, it is a principal object of the present invention to provide a process cartridge, a electrophotographic image forming apparatus, a driving force transmission part, and a electrophotographic photosensitive drum, wherein rotation accuracy of the electrophotographic photosensitive drum is improved.

It is another object of the present invention to provide a process cartridge, a electrophotographic image forming apparatus, a driving force transmission part, and an electrophotographic photosensitive drum, wherein the driving force is transmitted to the electrophotographic photosensitive drum from the main assembly assuredly.

It is a further object of the present invention to provide a process cartridge, electrophotographic image forming apparatus, a driving force transmission part, and an electrophotographic photosensitive drum, wherein the rotation center of a coupling of the main assembly of the device is made concentric with the rotation center of a coupling of the electrophotographic photosensitive drum when the driving force is transmitted (upon the performing of an image forming operation).

It is a further object of the present invention to provide a process cartridge, a electrophotographic image forming apparatus, a driving force transmission part and an electrophotographic photosensitive drum, wherein the positioning of the process cartridge relative to the device is improved by pulling the electrophotographic photosensitive drum into the main assembly side when the driving force is transmitted.

It is a further object of the present invention to provide a process cartridge, a electrophotographic image forming apparatus, a driving force transmission part, and an electrophotographic photosensitive drum, wherein image quality is improved.

It is a further object of the present invention to provide a process cartridge, a electrophotographic image forming apparatus, a driving force transmission part, and a electrophotographic photosensitive drum, wherein the connection in the driving force transmission mechanism between the main assembly and the process cartridge is broken when the driving force is not transmitted (the non-image-formation period), so that the operativity in demounting the process cartridge from the main assembly is improved.

It is a further object of the present invention to provide a process cartridge, an electrophotographic image forming apparatus, a driving force transmission part, and an electrophotographic photosensitive drum, wherein a projection is provided in a recess.

According to this aspect of the present invention, foreign matter is prevented from entering the recess.

It is a further object of the present invention to provide a process cartridge, an electrophotographic image forming apparatus, a driving force transmission part and an electrophotographic photosensitive drum, wherein an end surface of a projection is provided with a recess.

According to this aspect of the present invention, the accuracy of the configuration of the projection can be improved.

It is a further object of the present invention to provide a process cartridge, an electrophotographic image forming apparatus, a driving force transmission part, and an electrophotographic photosensitive drum, wherein a portion of a recess not contactable with a projection is expanded.

According to this aspect of the present invention, the accuracy of the configuration of the recess can be improved.

It is a further object of the present invention to provide a process cartridge, an electrophotographic image forming apparatus, a driving force transmission part and an electrophotographic photosensitive drum, wherein a projection is provided in a recess, and a recess is provided in the projection.

According to this aspect, the recess and the projection are prevented from damage thereto, even if the apparatus is transported or carried with the process cartridge loaded therein.

According to an aspect of the present invention, there is provided a process cartridge detachably mountable to a main assembly of an image forming apparatus for forming an image on a recording material, said main assembly including a motor, a driving rotatable member for receiving a driving force from said motor and a twisted recess or projection having a non-circular cross-section and substantially coaxial with a rotation axis of the drive rotatable member, comprising: a rotatable image bearing member; process means actable on said photosensitive drum; and a twisted projection or recess provided at a longitudinal end of said image bearing member, having a non-circular cross-section and substantially coaxial with a rotation axis of said image bearing member, wherein the projection or recess of the image bearing member has such a dimension and configuration that it can take a first relative rotational position with respect to the recess or projection of the driving rotatable member in which relative rotational movement therebetween is permitted, and a second relative rotational position with respect to the recess or projection of the driving rotatable member in which relative rotational movement is prevented in one rotational direction, while the rotation axis of the driving rotatable member and the rotation axis of the image bearing member are substantially aligned.

According to another aspect of the present invention, there is provided an electrophotographic image forming apparatus for forming an image on a recording material, comprising: an electrophotographic photosensitive drum; charging means for charging the photosensitive drum; developing means for developing a latent image formed on the photosensitive drum into a toner image; transfer means for transferring the toner image onto the recording material; fixing means for fixing the toner image on the recording material; a motor; a main assembly side gear for receiving a driving force from the motor; a twisted hole formed substantially at a center of the gear, the hole having a polygonal cross-section; a twisted prism projection provided at a longitudinal end of the photosensitive drum, wherein when the main assembly side gear rotates with the hole and projection engaged with each other, a rotational driving force is transmitted from the gear to the photosensitive drum through the hole and the projection with the projection being pulled into the hole; and moving means for imparting relative movement between the hole and the projection in a longitudinal direction of the photosensitive drum.

According to another aspect of the present invention, there is provided a process cartridge detachably mountable to a main assembly of an image forming apparatus, wherein the main assembly includes a motor, a main assembly side gear for receiving a driving force from the motor and a twisted hole formed substantially at a center of the gear, the hole having a polygonal cross-section; an electrophotographic photosensitive drum; process means actable on the photosensitive drum; and a twisted polygonal prism projection provided at a longitudinal end of the photosensitive drum, wherein when the main assembly side gear rotates with the hole and projection engaged with each other, a rotational driving force is transmitted from the gear to the photosensitive drum through the hole and the projection with the projection being pulled into the hole.

According to another aspect of the present invention, there is provided an electrophotographic image forming apparatus, for forming an image on a recording material, to which a process cartridge is detachably mountable comprising: a motor; a main assembly side gear for receiving a driving force from the motor; a twisted hole formed substantially at a center of the gear, the hole having a polygonal cross-section; means for mounting a process cartridge which includes: an electrophotographic photosensitive drum; process means actable on the photosensitive drum; a twisted polygonal prism projection provided at a longitudinal end of the photosensitive drum, wherein when the main assembly side gear rotates with the hole and projection engaged with each other, a rotational driving force is transmitted from the gear to the photosensitive drum through the hole and the projection with the projection being pulled into the hole; and the apparatus further comprising: moving means for imparting relative movement between the hole and the projection in a longitudinal direction of the photosensitive drum; and means for feeding the recording material.

According to another aspect of the present invention, there is provided a drive transmission part for transmitting a driving force to an electrophotographic photosensitive drum and a developing roller for developing a latent image formed on the photosensitive drum, which are contained in a process cartridge detachably mountable to a main assembly of an image forming apparatus for forming an image on a recording material, the main assembly including a motor, a main assembly side gear for receiving a driving force from the motor, and a twisted hole formed substantially at a center of the gear, the hole having a polygonal cross-section; a gear for transmitting driving force to the developing roller from the main assembly to the developing roller when the process cartridge is mounted to the main assembly; a shaft provided substantially at a center of the gear; a twisted polygonal prism projection provided at an end of the shaft, wherein the projection receives a driving force from the main assembly through engagement between the hole and projection, wherein the driving force is transmitted to the photosensitive drum through the shaft, and is transmitted to the developing roller through the gear.

According to another aspect of the present invention, there is provided a photosensitive drum, which is contained in a process cartridge detachably mountable to a main assembly of an image forming apparatus for forming an image on a recording material, the main assembly including a motor, a main assembly side gear for receiving a driving force from the motor, and a twisted hole formed substantially at a center of the gear, the hole having a polygonal cross-section; a cylinder having a photosensitive layer thereon; a drive transmission member mounted to an end of the cylinder, the transmission member including: a gear for transmitting a driving force to the developing roller from the main assembly to the developing roller when the process cartridge is mounted to the main assembly; a shaft provided substantially at a center of the gear; a twisted polygonal prism projection provided at an end of the shaft, wherein the projection receives a driving force from the main assembly through engagement between the hole and projection, wherein the driving force is transmitted to the photosensitive drum through the shaft, and is transmitted to the developing roller through the gear.

According to another aspect of the present invention, there is provided a process cartridge detachably mountable to a main assembly of an electrophotographic image forming apparatus, wherein the main assembly includes a motor, a main assembly side gear for receiving a driving force from the motor and a main assembly recess defined by twisted surface, the main assembly recess being substantially coaxial with the gear, and a main assembly projection provided in the main assembly and substantially coaxial with the gear, the process cartridge comprising: an electrophotographic photosensitive drum; process means actable on the photosensitive drum; and a twisted cartridge projection engageable with the twisted surfaces, the projection being provided at a longitudinal end of the photosensitive drum; a cartridge recess provided at a free end of the cartridge projection and substantially coaxial with the cartridge projection, wherein when the process cartridge is mounted to the main assembly, the main assembly projection enters the cartridge recess; wherein, when the main assembly side gear rotates with the main assembly recess and cartridge projection engaged with each other, a rotational driving force is transmitted from the gear to the photosensitive drum through engagement between the main assembly recess and the cartridge projection.

According to another aspect of the present invention, there is provided a drive transmission part for transmitting a driving force to an electrophotographic photosensitive drum and a developing roller for developing a latent image formed on the photosensitive drum, which are contained in a process cartridge detachably mountable to a main assembly of an electrophotographic image forming apparatus for forming an image on a recording material, the main assembly including a motor, a main assembly side gear for receiving a driving force from the motor, a twisted recess formed substantially at a center of the gear, the recess having a polygonal cross-section, a main assembly projection provided in the recess, the drive transmission part comprising: a gear for transmitting driving force to the developing roller from the main assembly to the developing roller when the process cartridge is mounted to the main assembly; a shaft provided substantially at a center of the gear; a twisted projection provided at an end of the shaft, wherein the projection receives a driving force from the main assembly through engagement between the recess and projection, wherein a cartridge recess is provided in the twisted projection, wherein, the driving force is transmitted to the photosensitive drum through the shaft, and is transmitted to the developing roller through the gear with the main assembly projection being in the cartridge recess.

According to another aspect of the present invention, there is provided a photosensitive drum, which is contained in a process cartridge detachably mountable to a main assembly of an electrophotographic image forming apparatus for forming an image on a recording material, the main assembly including a motor, a main assembly side gear for receiving a driving force from the motor, a twisted recess formed substantially at a center of the gear, the recess having a polygonal cross-section, and a main assembly projection provided in the recess, the photosensitive drum comprising: a cylinder having a photosensitive layer thereon; a drive transmission member mounted to an end of the cylinder, the transmission member including: a gear for transmitting a driving force to the developing roller from the main assembly to the developing roller when the process cartridge is mounted to the main assembly; a shaft provided substantially at a center of the gear; a twisted projection provided at an end of the shaft, wherein the projection receives a driving force from the main assembly through engagement between the recess and projection, wherein a cartridge recess is provided in the twisted projection, wherein the driving force is transmitted to the photosensitive drum through the shaft, and is transmitted to the developing roller through the gear with the main assembly projection.

According to another aspect of the present invention, there is provided an electrophotographic image forming apparatus for forming an image on a recording material, to which a process cartridge is detachably mountable, comprising: (a) a motor; (b) a main assembly side gear for receiving a driving force from the motor; (c) a main assembly recess defined by twisted surfaces, the main assembly recess being being substantially coaxial with the gear; (d) a main assembly projection provided in the main assembly and being substantially coaxial with the gear; (e) a mounting member for detachably mounting the process cartridge, which includes: an electrophotographic photosensitive drum; process means actable on the photosensitive drum; and a twisted cartridge projection engageable with the twisted surfaces, the projection being provided at a longitudinal end of the photosensitive drum; a cartridge recess provided at a free end of the cartridge projection and substantially coaxial with the cartridge projection, wherein when the process cartridge is mounted to the main assembly, the main assembly projection enters the cartridge recess; wherein, when the main assembly side gear rotates with the main assembly recess and cartridge projection engaged with each other, a rotational driving force is transmitted from the gear to the photosensitive drum through engagement between the main assembly recess and the cartridge projection; and the apparatus further comprising: (f) feeding means for feeding the recording material.

In the foregoing the recess and projection may be exchanged with each other.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be described in conjunction with the accompanying drawings.

Embodiment 1

Referring to FIG. 1 to FIG. 10, a description will be provided as to a process cartridge and an electrophotographic image forming apparatus to which it is detachably mountable according to embodiment 1. In the following description, the general arrangement of the process cartridge and the electrophotographic image forming apparatus usable therewith will be first described referring to FIG. 1 to FIG. 6, and then the structure of a coupling of a driving force transmission mechanism between the process cartridge and the image forming apparatus, referring to FIG. 7 to FIG. 10.

General Arrangement

Figure 1:
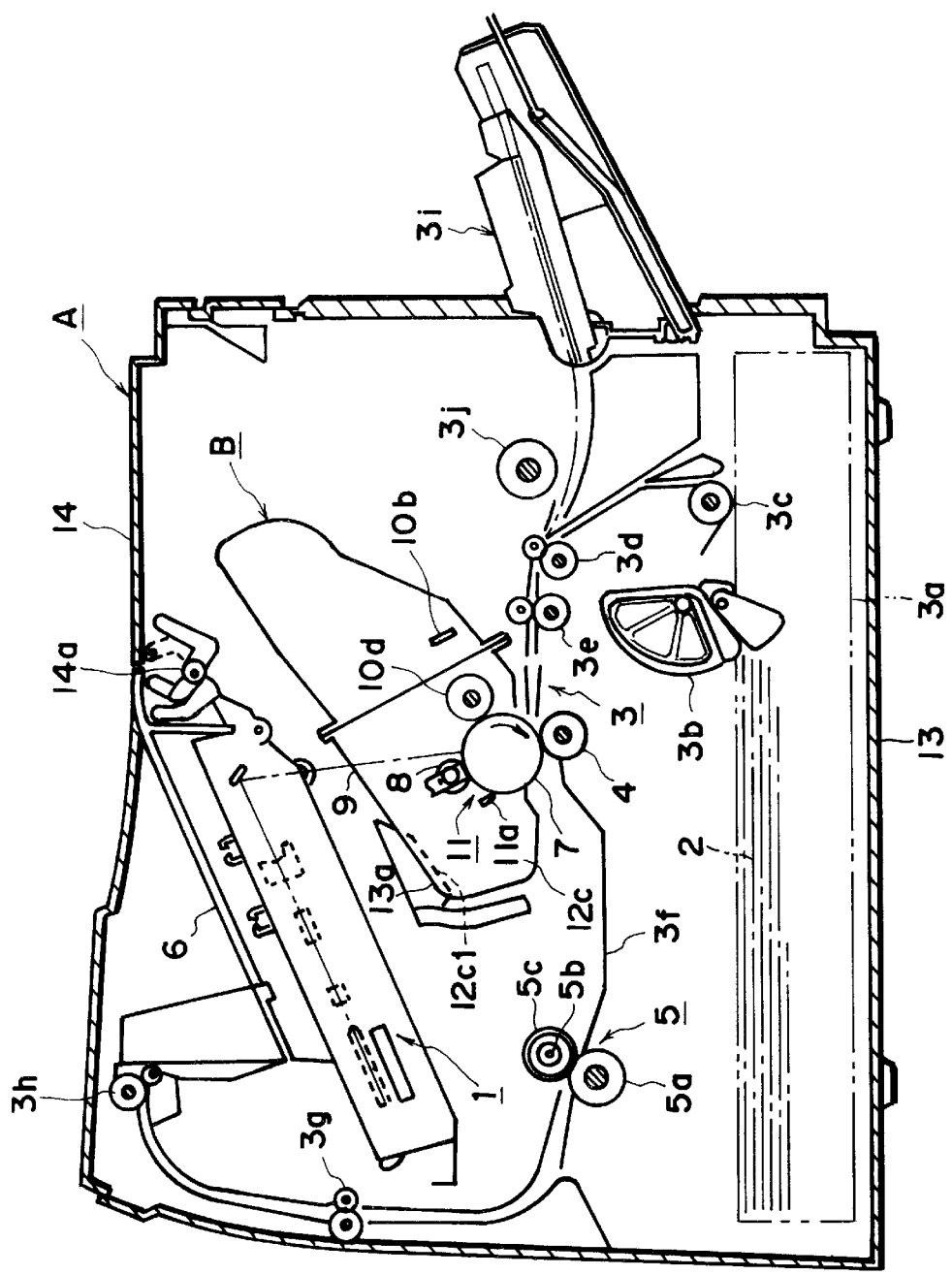
FIG. 1 is a cross-sectional view of an electrophotographic image forming apparatus according to an embodiment of the present invention.
Figure 2:
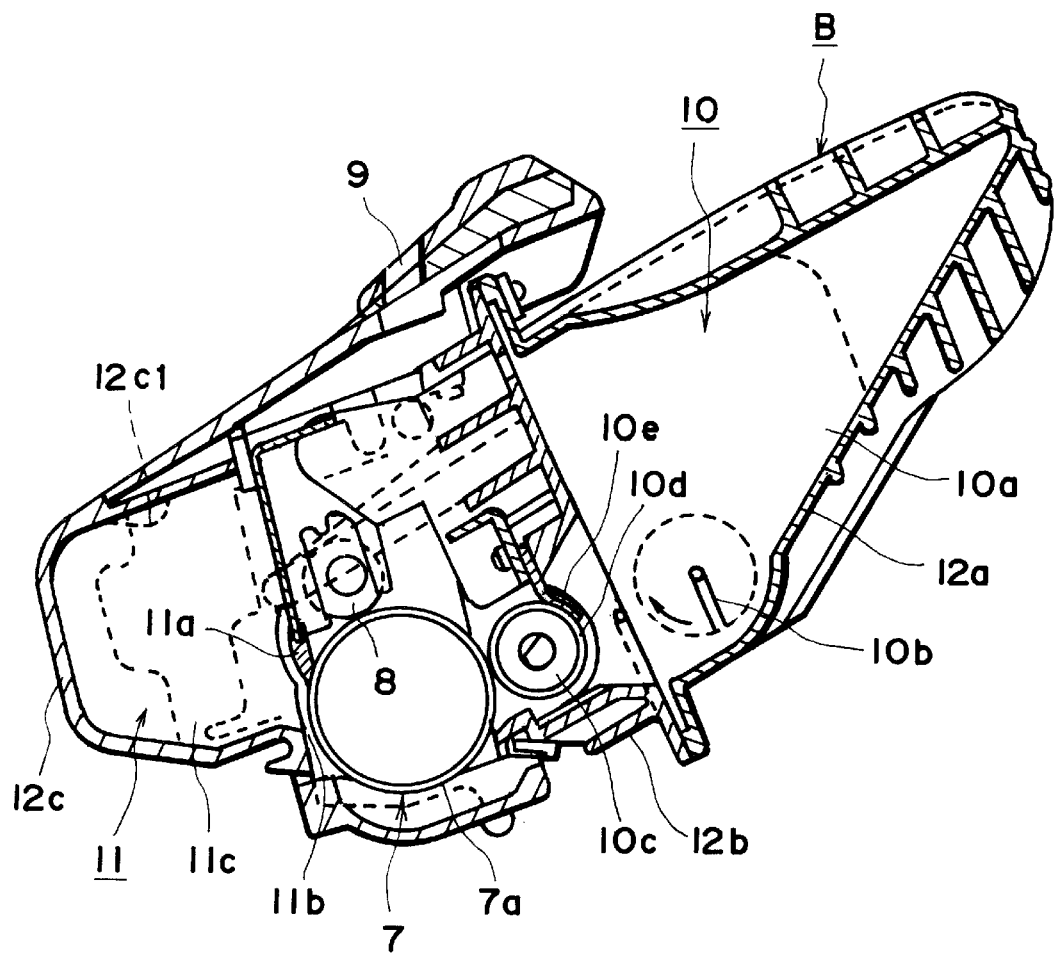
FIG. 2 is a cross-sectional view of a process cartridge according to an embodiment of the present invention.
Figure 3:
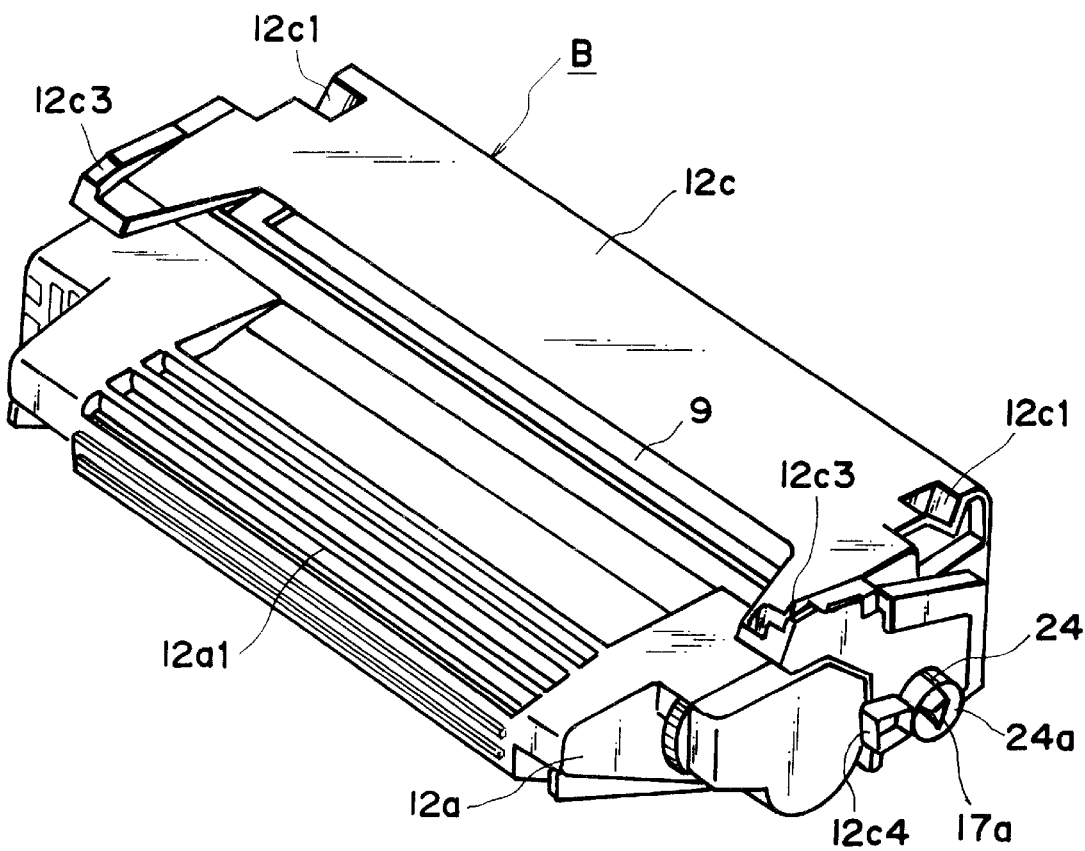
FIG. 3 is perspective view a process cartridge according to an embodiment of the present invention.
Figure 4:
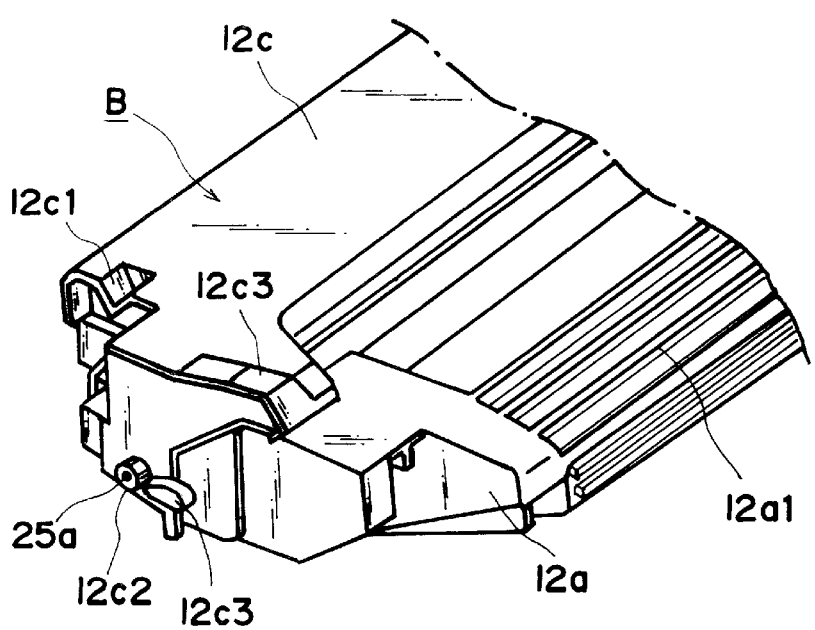
FIG. 4 is a perspective view of a process cartridge according to an embodiment of the present invention.
Figure 5:
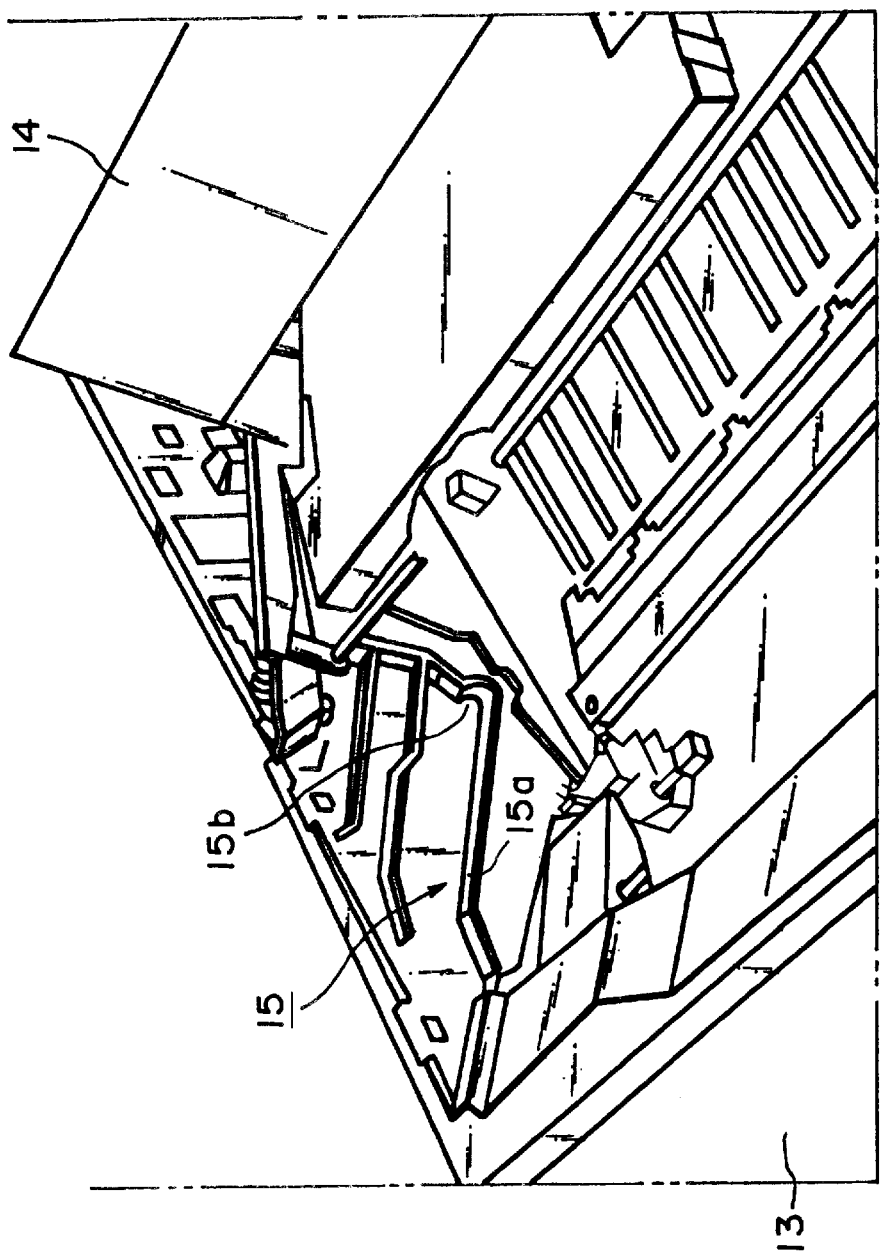
FIG. 5 is a perspective view of a process cartridge mounting portion of a main assembly of an electrophotographic image forming apparatus according to an embodiment of the present invention.
Figure 6:
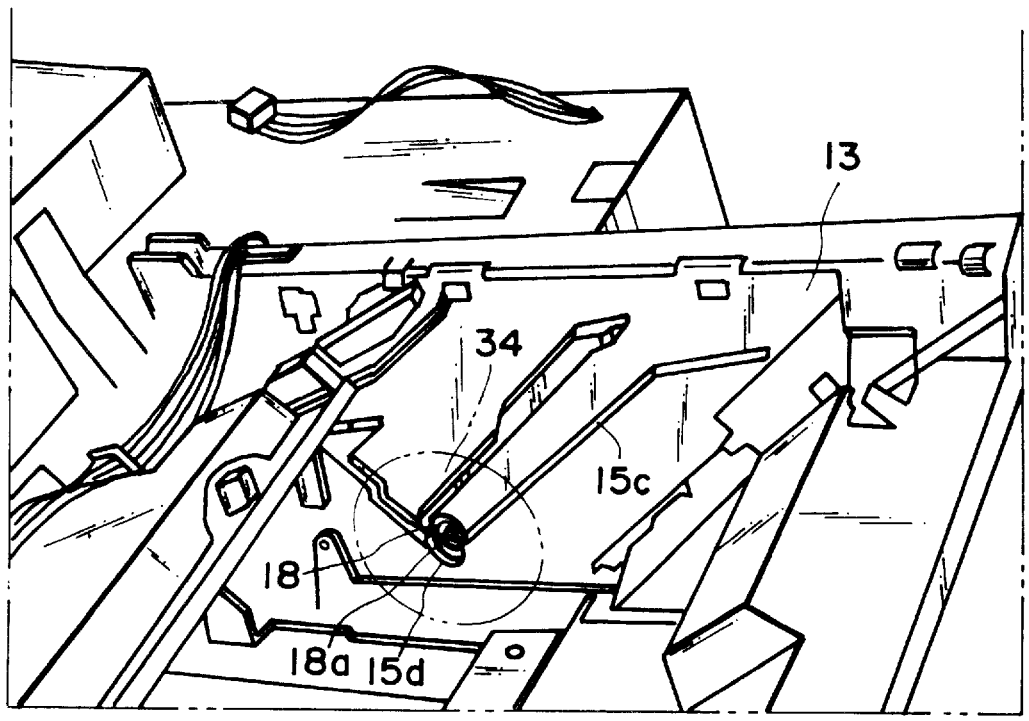
FIG. 6 is a perspective view of a process cartridge mounting portion of a main assembly of an electrophotographic image forming apparatus according to an embodiment of the present invention.

FIG. 1 is a schematic view of the electrophotographic image forming apparatus A to which the process cartridge is mounted; FIG. 2 is a cross-sectional view of the process cartridge B; FIG. 3 and 4 are perspective views of outer appearance of the process cartridge; and FIGS. 5 and 6 illustrate device structures for mounting the process cartridge to the main assembly of the device.

In this electrophotographic image forming apparatus (laser beam printer in the embodiment), as shown in FIG. 1, an electrophotographic photosensitive member 7 of a drum configuration is exposed to a laser beam based on an image information supplied from an optical system 1 so that a latent image is formed on the photosensitive member, and the latent image is developed with toner into a toner image. In synchronism with the formation of the toner image, a recording medium 2 (recording sheet or the like) is fed from a feeding cassette 3a by transporting means 3 comprising pick-up rollers 3b, feeding rollers 3c, feeding rollers 3d, registration rollers 3e or the like. The toner image formed on the photosensitive drum 7 is transferred onto the recording medium 2 by voltage application to the transfer roller 4 functioning as transferring means. The recording medium 2 is guided by a guide plate 3f to a fixing means 5. The fixing means 5 comprises a fixing roller 5c comprising a driving roller 5a and a heater 5b, and applies heat and pressure to the recording medium 2 to fix the transferred toner image onto the recording medium 2. The recording medium 2 is fed by the discharging rollers 3g and 3h, and is discharged to the discharging portion 6 through a reversion feeding path. In the image forming apparatus A, manual sheet feeding is possible using a manual feed tray and roller 3j.

The process cartridge B contains the electrophotographic photosensitive member and at least one process means. The process means includes, for example, charging means for charging the electrophotographic photosensitive member, developing means for developing the latent image on the electrophotographic photosensitive member, and cleaning means for removing the residual toner from the surface of the electrophotographic photosensitive member.

The process cartridge B of this example contains a photosensitive drum 7, the charging roller 8, the exposure opening 9, and the developing means 10, as shown. The electrophotographic photosensitive drum 7 in the process cartridge B is rotated through a coupling mechanism by the main assembly 13 of the device, as will be described hereinafter. The surface of the photosensitive drum is subjected to uniform charging by the voltage application to the charging roller 8 which is a charging means, and the information light from the optical system 1 is projected onto the photosensitive drum 7 through an exposure opening 9 for a latent image, which is developed by the developing means 10.

In the developing means 10, the toner in a toner accommodating portion 10a is fed out by rotation of a feeding member 10b. A developing roller 10d containing a fixed magnet 10c is rotated so that a toner layer having triboelectric charge provided by a development blade 10e is formed on the surface of the developing roller 10d. The toner is transferred to the photosensitive drum 7 in accordance with the latent image to form the toner image (visualization). The toner image is transferred onto the recording medium 2 by application of the voltage of the opposite polarity from the toner image to the transfer roller 4 provided in the main assembly 13 of the device. The photosensitive drum 7 after transfer is cleaned by the cleaning means 11 so that the residual toner is removed. More particularly, the toner is scraped off by the cleaning blade 11a. The toner thus removed is collected in a residual toner container 11c by a receptor sheet 11b.

The charging roller 8 contacts to the photosensitive drum 7 and is in driven by the photosensitive drum 7. The cleaning blade 11a is contact with the photosensitive drum 7.

The process cartridge B comprises a toner frame 12a having a toner accommodating portion 10a accommodating toner and a developing frame 12b supporting a developing member such as a developing roller 10d, which frames are welded together (ultrasonic welding in this example) to form a developing unit. This developing unit is swingably coupled with a cleaning frame 12c supporting the photosensitive drum 7, the charging roller 8, the cleaning means 11 and the like. The process cartridge B is mounted to a cartridge mounting means of the main assembly 13 of the device by an user in a direction crossing with a longitudinal direction of the photosensitive drum 7 (FIGS. 5 and 6). The cleaning frame 12c is provided with mounting guides 12c4 adjacent a bearing 12c2. The bearing 24 (projection 24a) mounted to the cleaning frame 12c is provided with a guide 24c. The bearing 24, projection 24a and guide 24c are integrally molded. The mounting guides 24c is guided by guides 15a 15b when the process cartridge B is mounted.

As cartridge mounting means, as shown in FIG. 5, cartridge mounting guiding members 15 are mounted opposed to each other on left and right sides of a cartridge mounting space of the main assembly 13 (one side in FIG. 5 and the other side in FIG. 6). The guiding members 15 have guide portions 15a and 15c opposed to each other to function as guides when the process cartridge B is pushed into the main assembly. The process cartridge is inserted while bosses or the like projected from opposite longitudinal ends of the cartridge frame are guided by the guide portions 15a and 15c. When the process cartridge B is to be mounted to the main assembly 13, a cover 14 which is openable about a shaft 14a is opened. By closing the openable cover 14, the process cartridge B is correctly mounting to the image forming apparatus A. When the process cartridge B is taken out from the main assembly 13, the openable cover 14 is opened.

When the process cartridge B is mounted to the image forming apparatus A, the cartridge side coupling and the main assembly side coupling are combined in interrelation with the closing operation of the openable cover 14, as will be described hereinafter, so that the photosensitive drum 7 and the like can receive the driving from the main assembly.

Coupling and Driving Structure

A description will be provided as to the structure of the coupling means which is a driving force transmission mechanism for transmitting the driving force to the process cartridge B from the main assembly 13 of the image forming apparatus.

Figure 7:
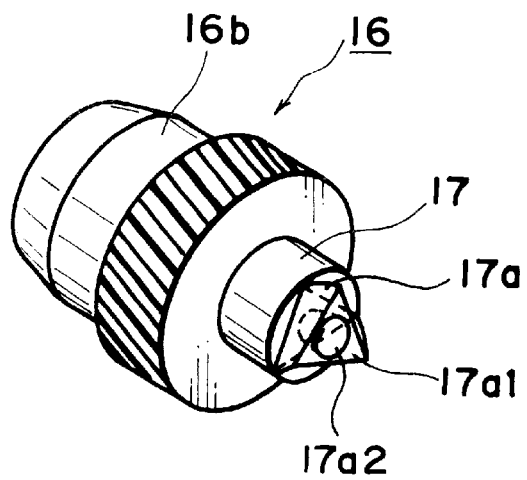
FIG. 7 is a perspective view of a drum flange (driving force transmission part) according to an embodiment of the present invention.
Figure 8:
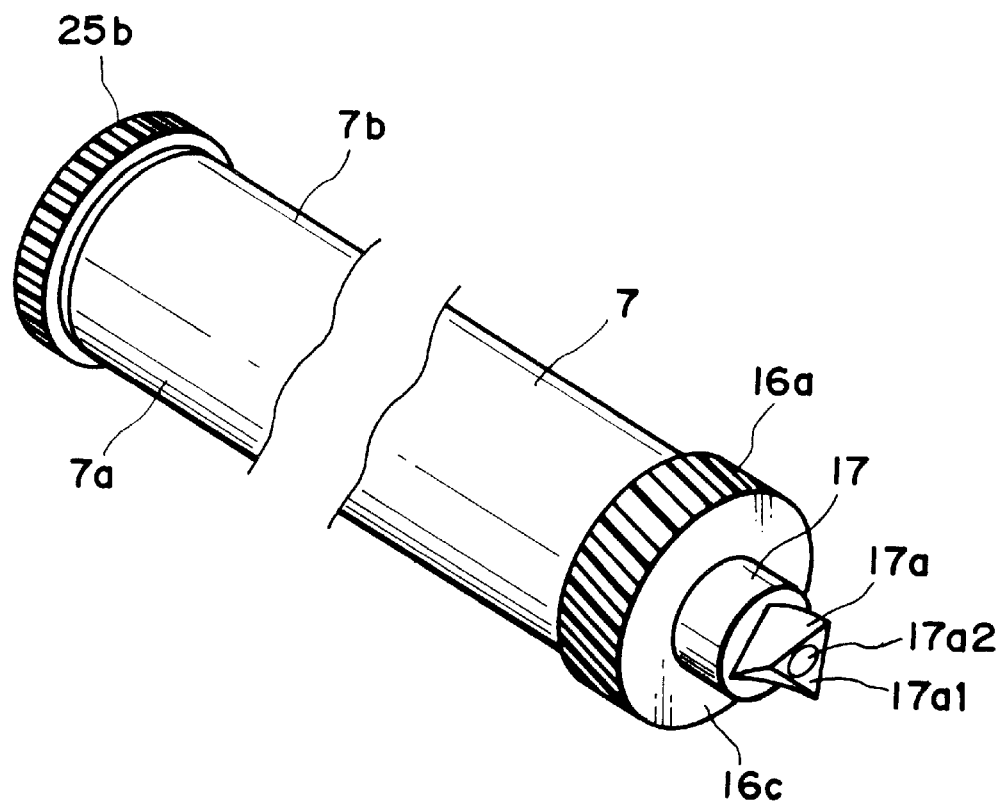
FIG. 8 is a perspective view of a photosensitive drum according to an embodiment of the present invention.
Figure 9:
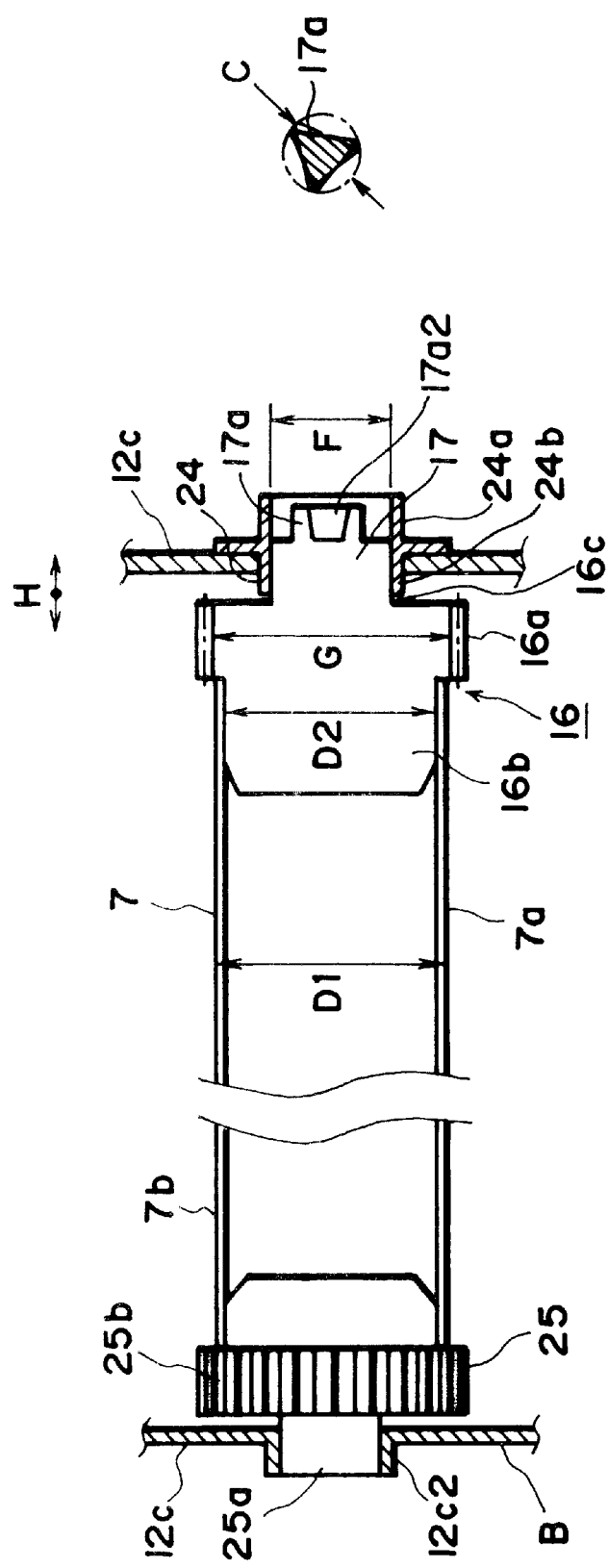
FIG. 9 is a sectional view of a process cartridge side coupling portion according to an embodiment of the present invention.
Figure 10:
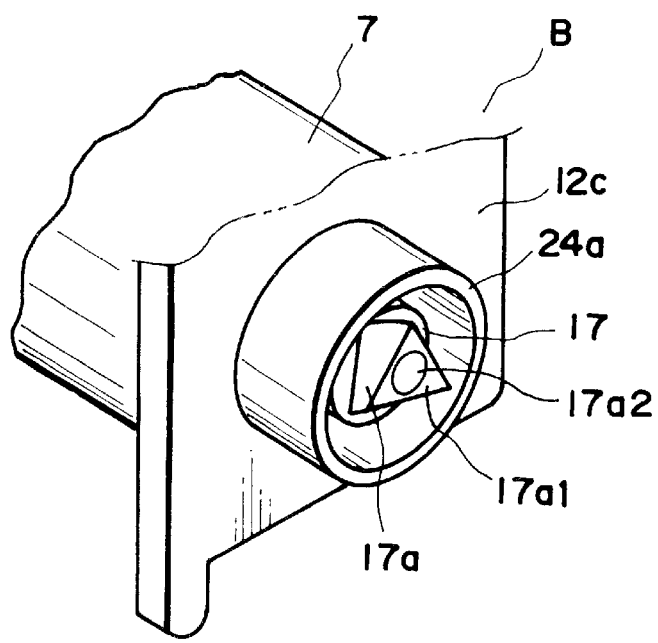
FIG. 10 is a perspective view of a coupling portion of a process cartridge according to a present invention of the present invention.
Figure 11:
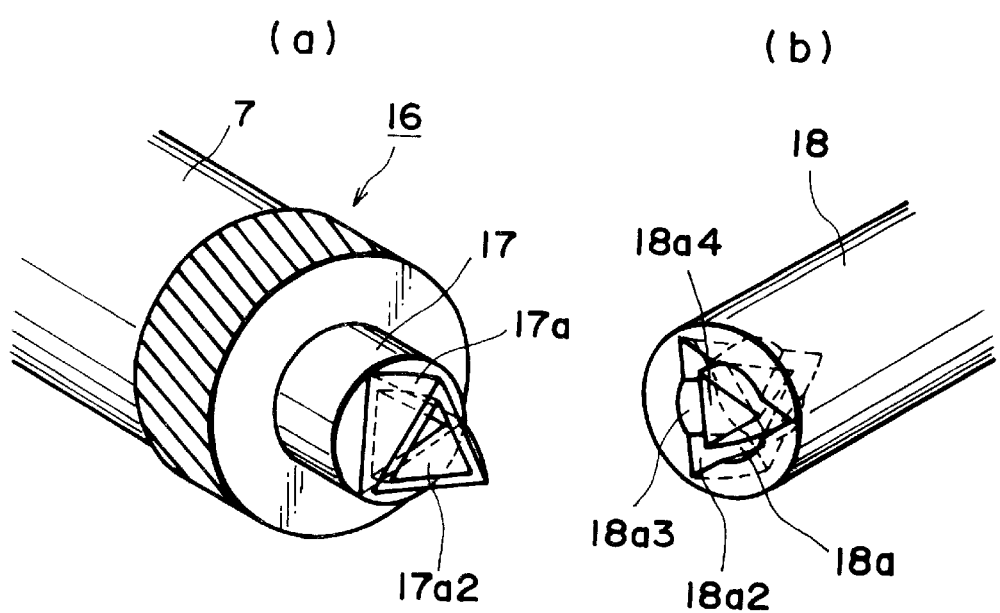
FIGS. 11($a$) and ($b$) are sectional views of a driving system of a main assembly of an electrophotographic image forming apparatus according to an embodiment of the present invention.

FIG. 7 is a perspective view of a drum flange 16 as a driving force transmission part having an integrally formed male shaft 17; FIG. 8 is a partly sectional perspective view of the photosensitive drum 7 having a drum flange 16 mounted thereto; FIG. 9 is a sectional view wherein the photosensitive drum 7 is mounted to the process cartridge B; FIG. 10 is an enlarged perspective view of the male shaft 17 of the process cartridge B of FIG. 9; FIG. 11 shows a relation between the male shaft 17 (provided to the process cartridge B) and the female shaft 18 (provided to the main assembly 13).

As shown in FIG. 8 to FIG. 10 and FIG. 28, there is provided a cartridge side coupling means at a longitudinal end of the photosensitive drum 7 in the process cartridge B. The coupling means has a male coupling shaft 17 (circular column configuration) mounted to the drum flange 16 fixed an end of the photosensitive drum 7. Here, the end surface of the projection 17a is parallel with the end surface of the projection shaft 17. The male shaft 17 is engaging with a bearing 24 and functions as a drum rotational shaft. In this example, the flange 16, male coupling shaft 17 and the projection 17a are integrally formed. The flange 16 is provided with a helical gear 16a for transmitting the driving force to the developing roller 10d in the process cartridge. Therefore, as shown in FIG. 7, the drum flange 16 is an integrally molded member having the helical gear 16a, the male shaft 17 and the projection 17a, and is a driving force transmission part having the function of transmitting the driving force.

The projection 17a has a twisted polygonal prism configuration, more particularly, the configuration resulting from twisting a substantially equilateral triangular prism in the rotational direction. The recess 18a is a polygonal shape twisted in the rotational direction of the shaft and therefore is engageable with or complementary with the projection 17a. The recess 18a has a section of substantially equilateral triangle. The recess 18a integrally rotates with the gear 34 of the main assembly 13. In the structure of this example, the process cartridge B is mounted to the main assembly 13, and the projection 17a and the recess 18a of the main assembly 13 are engaged. When the rotation force is transmitted from the recess 18a to the projection 17a, the apexes of the projection 17a of the equilateral triangle are contacted regularly with the inside surfaces of the recess 18a, and therefore, the centers thereof are automatically aligned by the rotation, as will be understood from FIG. 8, (a) and (b). Further, the force in the direction of pulling deviating the projection 17 to the recess 18 is produced during rotation due to the twisting directions thereof, so that the end surface 17a1 of the projection contacts to the recess 18a1. Since the photosensitive drum 7 is integral with the projection 17a, the axial position and radial position there are correctly determined in the main assembly 13 of the image forming apparatus.

Referring to FIGS. 7, 8, 9, 10, 11, 18, 22, 28, 29, 30, 31, 32 and 33, a description will be provided as to a hole 17a2 provided at a free end of the projection 17a, a projection 18a4 provided in the recess 18a and a configuration of the recess 18a.

Figure 18:
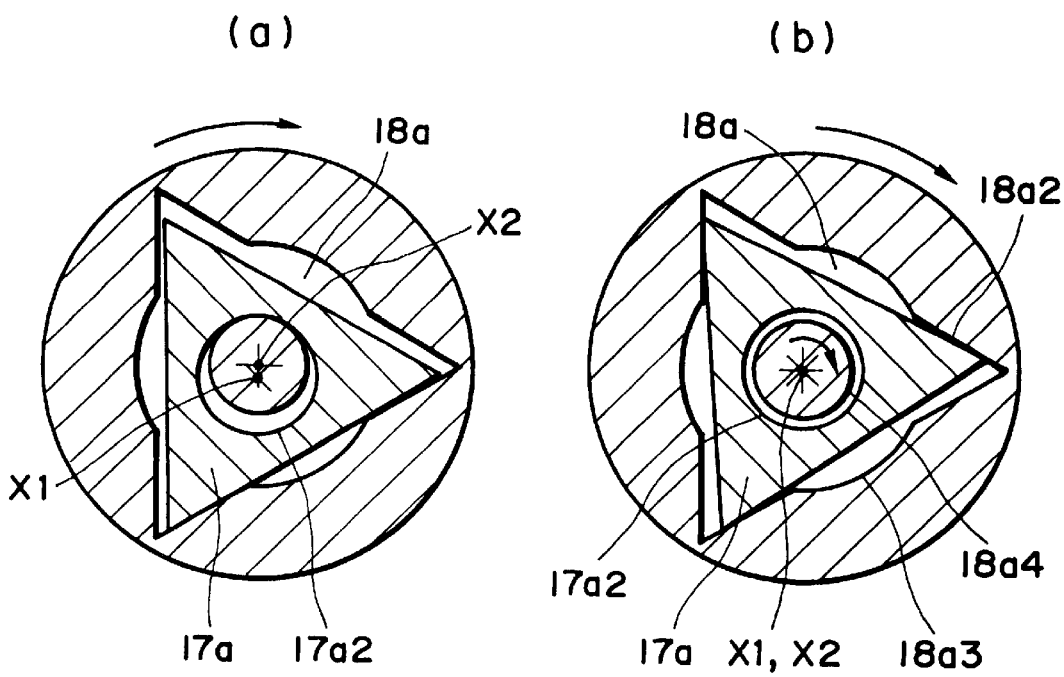
FIGS. 18(a) and (b) are sectional views of a recess and a coupling projection according to an embodiment of the present invention.
Figure 22:
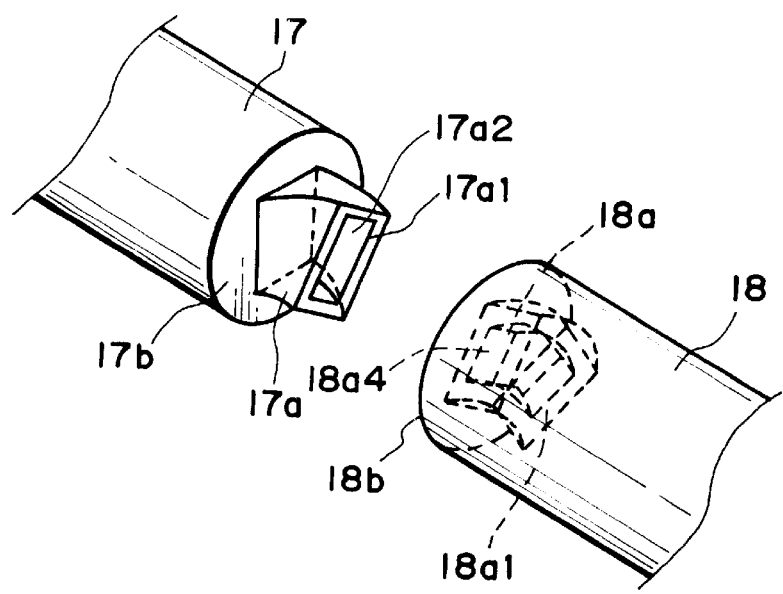
FIG. 22 is a perspective view of a recess and a coupling projection according to an embodiment of the present invention.

FIG. 18 is a sectional view of a male coupling projection and a recess, and FIG. 22 is a perspective view of the male coupling projection and the recess.

Figure 28:
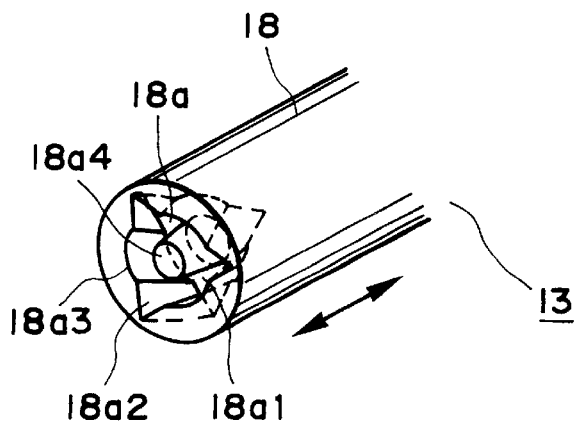
FIG. 28 is a perspective view of a female coupling shaft.

FIG. 28 is a perspective view, of the female coupling shaft.

Figure 29:
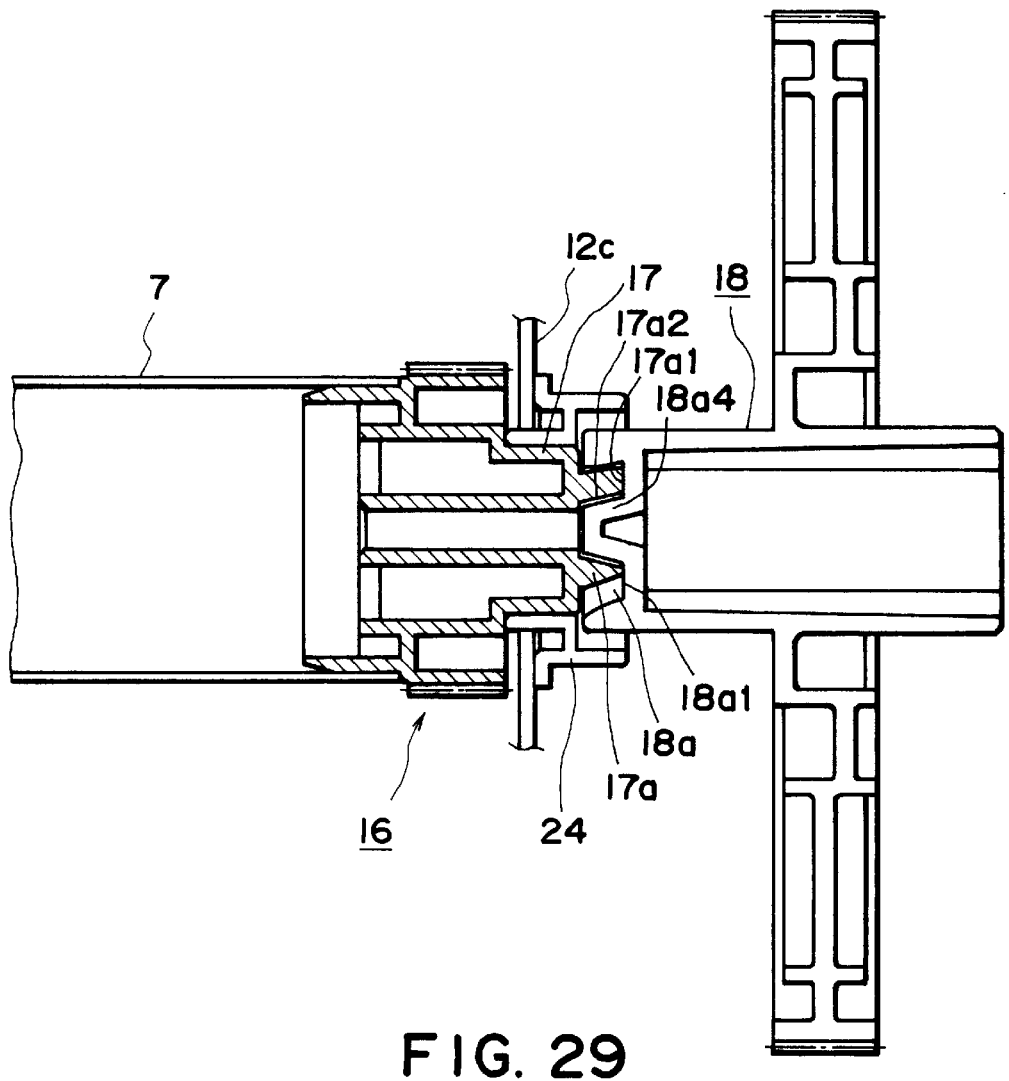
FIG. 29 is an axial sectional view of a male coupling projection and a recess (in a driving force transmitting position).

FIG. 29 is an axial sectional view of a male coupling projection and a recess (in a driving force transmitting position).

Figure 30:
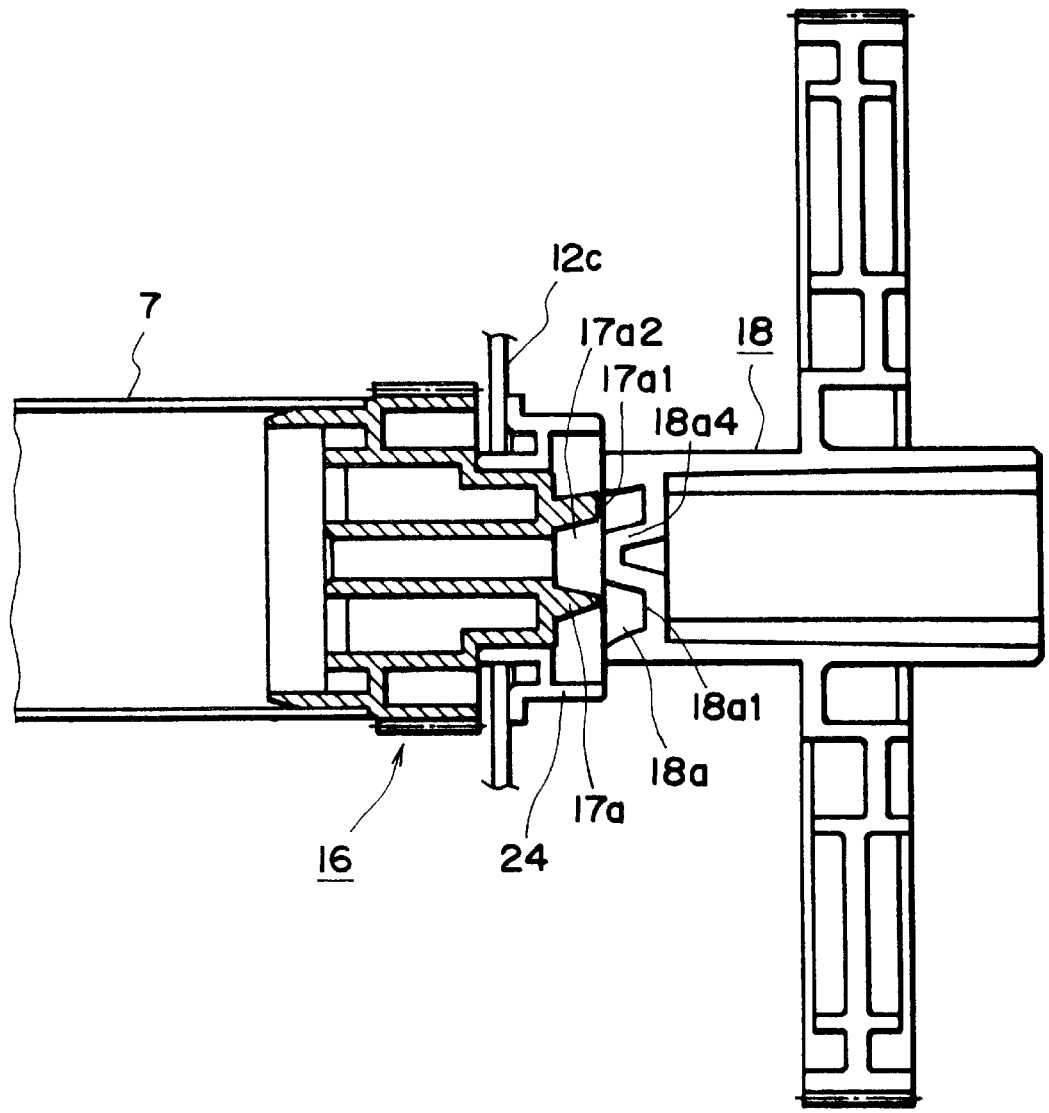
FIG. 30 is an axial sectional view of a male coupling projection and a recess (in a non-transmitting position).

FIG. 30 is an axial sectional view of a male coupling projection and a recess (in a non-transmitting position).

Figure 31:
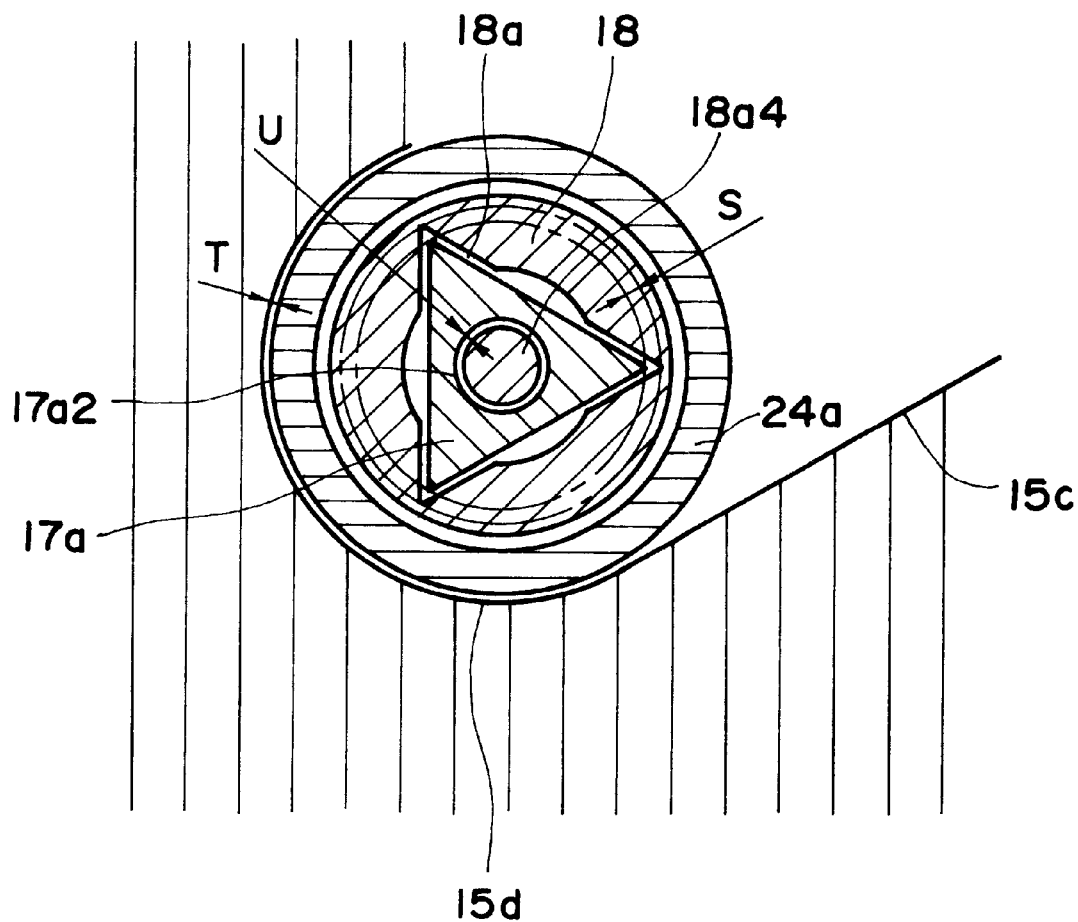
FIG. 31 is a sectional view around a male coupling projection and a recess (in a driving force transmitting position).

FIG. 31 is a sectional view around a male coupling projection and a recess (in a driving force transmitting position).

Figure 32:
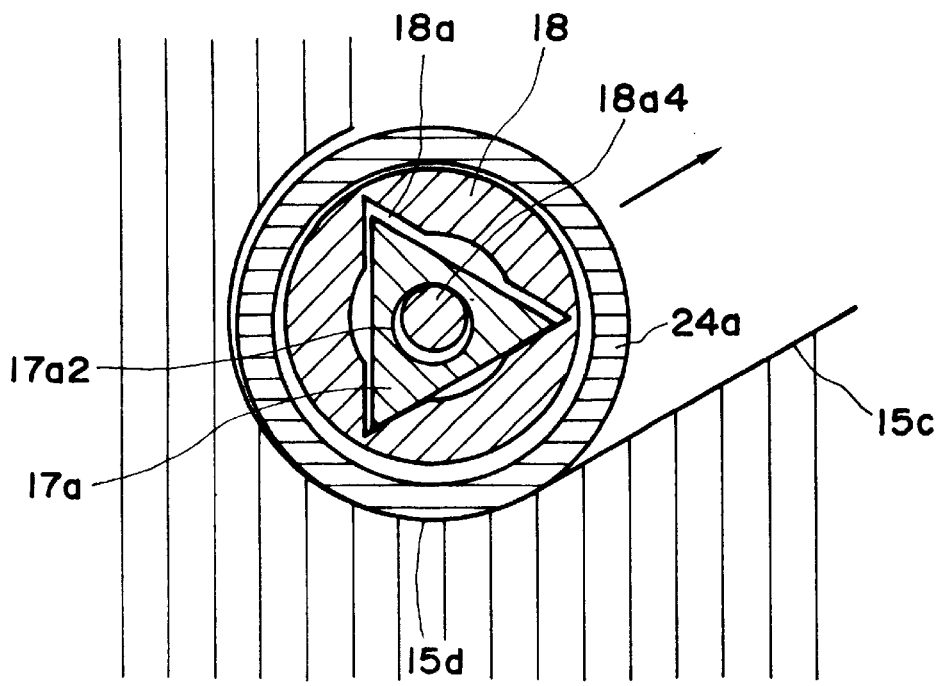
FIG. 32 is a sectional view around a male coupling projection and a recess (in a stand-by position).
Figure 33:
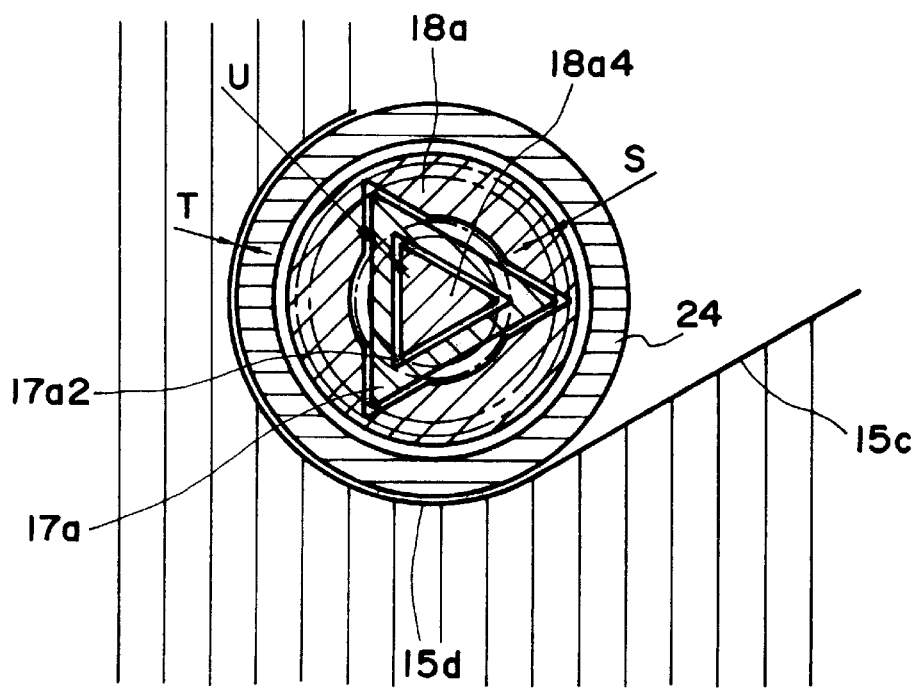
FIG. 33 is a sectional view of the structure around a male coupling projection and a recess (in a driving force transmitting position) according to a further embodiment.

FIG. 33 is a sectional view of the structure around a male coupling projection and a recess (in a driving force transmitting position) according to a further embodiment. FIGS. 31 and 32 shows the process cartridge B mounted to the main assembly 13 of the apparatus.

As will be understood from the Figures, the free end of the projection 17a is provided with a hole 17a2 in this embodiment. The inner surface of the hole 17a2 is inclined inwardly toward the deep side from the free end portion, namely, conical (frustoconical). The hole 17a2 has a circular cross-section, and is disposed substantially coaxial with the projection 17a. The hole 17a2 extends to the bottom surface of the projection 17a (free end surface of the male coupling projection 17).

The bottom of the hole 17a2 is provided with a through hole penetrating the drum flange 16.

On the other hand, a projection 18a4 is provided in the recess 18a. The projection 18a4 is inclined outwardly toward the deep side from the free end side (conical, or mountain-like). The projection 18a4 has a circular cross-section, and is substantially coaxial with the female coupling shaft 18. The projection is extended from a bottom surface of the recess 18a to a position slightly inside the free end surface of the female shaft 18.

When the process cartridge B is mounted to the main assembly 13 of the apparatus, and the cover 14 is closed, the projection 18a4 enters the hole 17a2. At this time, a gap or play exists between the outer peripheral surface of the projection 18a4 and the inner peripheral surface of the hole 17a2 (FIG. 18, (a), (b), and FIGS. 29, 31–33). As shown in these figures, when the driving force is transmitted, a play is provided between the entire outer peripheral surface of the projection 18a4 and the entire inner peripheral surface of the hole 17a2, (FIGS. 18, (b), 29, 31 and 33). Therefore, the projection 18a4 and hole 17a2 do not influence the drive transmission action. In the stand-by state, (non-drive-transmitting state), a part of the outer peripheral surface of the projection 18a4 and a part of the inner peripheral surface of the hole 17a2 are in contact (FIG. 18, (a) and FIG. 32).

As shown in FIGS. 29, 30 and 31, the relation between the hole 17a2 and the projection 18a4 is such that radial play therebetween when the male shaft 17 and the female shaft 18 are engaged with each other, is not more than the gap between the projection 24a (which will be described hereinafter) and the main assembly guide recess 15d (which will be described hereinafter) and than the radial play between the male coupling projection 17a and the recess 18a (approximately 0.3 mm–1.0 mm). Namely, S≧T≧U is satisfied, where S is a radial play between the male coupling projection 17a and the recess 18a; T is a play between the projection 24a and the main assembly guide recess 15d; U is a radial play between the hole 17a2 in the end surface of the projection 17a and the projection 18a4 in the recess 18a when the male shaft 17 and the female shaft 18 are engaged with each other.

As shown in FIGS. 29 and 30, V≧S is satisfied where V is a radial play between the entrance of the hole 17a2 and the free end of the projection 18a4. Therefore, when the male coupling projection 17a and the recess 18a are coupled, no interference occurs between the hole 17a2 in the end surface of the projection 17a and the projection 18a4 in the recess 18a.

Referring to, FIGS. 18, (a), (b), FIGS. 28, 31, 32 and 33, a description will be provided as to the configuration of the recess 18a.

The recess 18a engageable with the projection 17a is generally or as a whole a hole twisted in the rotational direction of the shaft and having a polygonal cross-section. That is, it functions as a twisted hole from the standpoint of the drive transmission. Therefore, the recess 18a is in the form of a hole twisted in the rotational direction at portions where it is contacted by the projection 17a. However, the portions not contactable with the projection 17a are expanded outwardly. By doing so, the thickness of the female shaft 18 at the portion where the recess 18a is provided is more uniform all around the female shaft 18. More particularly, such portions of the cross-section of the recess 18a as are contactable to the projection 17a, are parts of one substantially equilateral triangle, and the other portions are parts of one circle extending substantially along the outer periphery of the female shaft 18 (the circle is concentric with the center of the triangle in this embodiment, as will be understood from the figure).

The effects of the structure will be described.

The projection 17a is an integrally molded plastic material. The provision of the hole 17a2 in the end surface of the projection 17a is effective to suppress variation of the resin material temperature and/or the pressure in the mold during the manufacturing process and to reduce the contraction of the resin material, thus stabilizing the accuracy of the configuration of the projection 17a.

The member in which the recess 18a is formed, is an integrally molded plastic material. Since the portions of the recess 18a other than the portions contactable to the projection 17a are arcuate along the contact portion of the female shaft 18, variation of the resin material temperature and/or the pressure in the mold is suppressed during manufacturing, and the contraction of the resin material is reduced, thus stabilizing the accuracy of the configuration of the recess 18a. Non-uniformity in the rotation or rattling of the contact points due to load variation in the drive transmission or the like can be minimized, so that rotational accuracy of the photosensitive drum 7 can be further improved.

The effects of the coupling between the hole 17a2 and the projection 18a4 will be described.

As described in the foregoing, the entrance of the hole 17a2 and the free end of the projection 18a4 are so related that radial play is not less than the play between the projection 24a and the main assembly guide portion projection 15d, and therefore, the engagement between the projection 17a and the recess 18a is not influenced. The hole 17a2 and the projection 18a4 are so related that radial play when the male shaft 17 and the female shaft 18 are coupled with each other, is not more than the radial play between the male coupling projection 17a and the recess 18a. Therefore, even when the apparatus is transported or carried while process cartridge B is mounted in the main assembly thereof, the contact portions between the male coupling projection 17a and the recess 18a are not damaged.

As described in the foregoing, a part of the outer peripheral surface of the projection 18a4 contacts to a part of the inner peripheral surface of the hole 17a2 during the transfer or when the image forming operation is not carried out (non-drive-transmitting state) (FIG. 18, (a) and FIG. 32). Therefore, even if the apparatus (printer or the like) is moved with the process cartridge loaded therein, the relative movement between the recess 18a and the projection 17a in the radial direction is stopped by the hole 17a2 and the projection 18a4, and damage of the projection 17a and the recess 18a, due to vibration or the like, can therefore, be avoided.

Additionally, by the provision of the projection 18a4 in the recess 18a, foreign matter is prevented from entering the recess 18a when the process cartridge is assembled in the plant, when the process cartridge is mounted to the main assembly, when the process cartridge is removed from the main assembly for the purpose of maintenance of the main assembly, or the like. So, the damage to the recess 18a is further prevented.

In this example, as seen from the photosensitive drum 7, the direction of twisting of the projection 17a is opposite from the rotation direction of the photosensitive drum 7 away from the base portion of the projection toward the end portion thereof. The direction of twisting of the recess 18a is opposite therefrom away from the inlet portion of the recess 18a toward the inside. The direction of twisting of the helical gear 16a of the drum flange 16, which will be described hereinafter, is opposite from the twisting direction of the projection 17a.

As shown in FIG. 18, the projection 17a and the recess 18a satisfy d1<d0<d2, where d0 is a diameter of a circumscribed circle R0 of the triangular prism of the projection 17a, d1 is a diameter of an inscribed circle R1 of the space in the form of triangle of the recess 18a, and d2 is a diameter of a circumscribed circle R2 of the triangle.

Preferable examples of the numerical ranges of the diameters are as follows:
d0=approximately 3 mm–70 mm
d1=approximately 3 mm–70 mm
d2=approximately 3 mm–70 mm In these ranges, the sizes are selected so as to satisfy the above-described relations.

In this example, the sizes are as follows:
d0=approximately 16 mm
d1=approximately 9.5 mm
d2=approximately 17.5 mm The degree or amount of the twisting of the projection 17a is approximately 1°–15° per 1 mm of the axial length of the projection 17a in the rotational direction. More particularly, in this example, it is twisted at approximately 7.5° per 1 mm of the axial length.

The amount of twisting of the recess 18a is substantially the same as the amount of twisting of the above-described projection 17a.

Specific examples of the sizes of the hole 17a2 and the projection 18a 4 are as follows:
Diameter of the hole 17a2 at the free end:
Approximately 1.0 mm–50.0 mm (approximately 7.5 mm in this embodiment)
Diameter of the hole 17a2 at the bottom thereof:
Approximately 1.0 mm–50.0 mm (approximately 5.5 mm in this embodiment)
Depth of the hole 17a2:
Approximately 1.0 mm–30.0 mm (approximately 4.5 mm in the embodiment)

Diameter of the projection 18a4 at the free end:
Approximately 1.0 mm–50.0 mm (approximately 4.5 mm in the embodiment)
Diameter of the projection 18a4 at the base portion:
Approximately 1.0 mm–50.0 mm (approximately 6.5 mm in the embodiment)
Length of the projection 18a4 (projection length):
Approximately 1.0 mm–30.0 mm (approximately 4.0 mm in the embodiment)

The configurations and the sizes of the projection 17a and the recess 18a of the present invention, are not limited to the above, and properly selected by one skilled in the art. For example, as shown in FIG. 11, the hole 17a2 may be a triangular hole, and the projection 18a 4 may be a triangular prism which is a little smaller than the hole.

However, the present invention is not limited to these values.

The position of a cross-section of a three dimensional member is determined by its contact points, theoretically. When the configurations of the projections 17a and the recesses 18a are substantially equilateral and triangular, the apexes of the projection 17a contact to the inside surfaces of the equilateral triangle under the same conditions. Therefore, the changes of the contact points and the rotation non-uniformity of the coupling driving due to the load variation during the rotation of the process cartridge B are minimized, thus improving the rotation accuracy of the photosensitive drum 7 (FIG. 18). The male shaft 17 and projection 17a are provided on the drum flange 16 so that when the drum flange 16 is mounted to an end of the photosensitive drum 7, it is aligned with the axis of the photosensitive drum 7. Designated by 16b is an engaging portion which is engaged with an inside surface of the drum cylinder 7a when the drum flange 16 mounted to the photosensitive drum 7. The drum flange 16 is mounted to the photosensitive drum 7 by cramping, bonding or the like. The outer surface of the drum cylinder 7a is coated with a photosensitive material 7b (FIGS. 8 and 9 reference).

A drum flange 25 is fixed to the other end side of the photosensitive drum 7. The drum flange 25 has a drum shaft 25a and spur gear 25b integrally formed therewith.

When the process cartridge B is mounted to the main assembly 13 of the apparatus, the drum shaft 25a (bearing 12c2) is engaged with an U groove 15b (FIG. 5) of the main assembly 13 of the apparatus so as to be correctly positioned, and the spur gear 25b integrally molded with the flange 25 is meshed with a gear (shown) for transmitting the driving force to the transfer roller 4.

Examples of the material of the drum flange 16 include polyacetal (polyacetal), polycarbonate (polycarbonate) and polyamide (polyamide), polybutylene terephthalate, or another resin material. Other materials are usable.

Around the projection 17a of the male coupling shaft 17 of the process cartridge B, a circular projection 24a coaxial with the male shaft 17 is provided on the cleaning frame 12c (FIGS. 3 and 9). The projection 24a functions to protect the coupling projection 17a when, for example, the process cartridge B is mounted or demounted relative to the main assembly, so that the coupling projection 17a is prevented from being damaged or deformed by external force or the like. Thus, vibration or wobbles during the coupling driving operation due to the damage of the projection 17a, can be avoided.

The projection 24a also can function as a guiding member for the mounting and demounting of the process cartridge B relative to the main assembly 13 of the image forming apparatus. More particularly, when the process cartridge B is mounted to the main assembly A, the projection 24a contacts to the main assembly side guide portion 15c and functions to guide the process cartridge B to the mounting position of the apparatus, thus facilitating the mounting-and-demounting of the process cartridge B relative to the main assembly 13. When the process cartridge B is mounted to the mounting position, the projection 24a is supported by the recess 15d provided on the guide portion 15c. When the male coupling shaft 17 and female shaft 18 are aligned by the driving for the image formation, the projection 24a is raised slightly from the U groove 15d (approximately 0.3 mm–1.0 mm), and the gap between the projection 24a and the main assembly guide portion 15a (recess 15d) is smaller than the gap between the coupling projection 17a and the recess 18a in the radial direction. Therefore, the engagement between the coupling projection 17a and the recess 18a is permitted while the process cartridge B is mounted to the main assembly 13. A recess 18a is provided opposed to the U groove 15d. The configuration of the projection 24a is not limited to being circular as in this example, but may be any configuration, for example, an arcuate configuration, if it is guided by the guide portion 15c, and is supported by the U groove 15d. In this example, the bearing 24 for supporting rotatably the shaft portion 17 and the circular projection 24a are integrally molded, and is fixed to the cleaning frame 12c by screws (FIG. 9), but the bearing 24 and the projection 24a may be separate members.

In this example, the drum shaft 25a is engaged with the bearing portion 12c2 provided in the cleaning frame 12c (FIG. 4), and the male shaft 17 is engaged to the inside surface of the bearing 24 provided in the cleaning frame 12c, and with in state, the photosensitive drum 7 is mounted to the cleaning frame 12c of the process cartridge B. Therefore, the photosensitive drum 7 is rotated about the shaft 17 and 25a. In this example, the photosensitive drum 7 is mounted to the cleaning frame 12c in the manner that the movement thereof in the axial direction is possible. This is done in consideration of the mounting tolerance. But this structure is not inevitable, and the photosensitive drum 7 may be non-movable in the slide direction.

Among the photosensitive drum 7, the flange 16 and the male coupling shaft 17, there is a relationship as shown in FIG. 9. More particularly, the outer diameter of the photosensitive drum 7 (outer diameter of the cylinder 7a)=D1, the helical gear dedendum circle diameter=G, the diameter of the photosensitive drum bearing (outer diameter of the shaft portion 17, the inner diameter of the bearing 24)=F, the diameter=C of the circumscribed circle of the coupling projection, and the engaging portion diameter (drum inner diameter)=D2 of the drum flange 16 relative to the photosensitive drum 7, satisfy $D1>F \geq C$ and $G>D2$.

The expression $D1>F$ is effective to reduce the torque required by the sliding load at the bearing. The expression $F \geq C$ is effective to simplify the mold structure when the flange portion is molded since the undercut portion is not required which otherwise is required, in the mold division of the mold in the direction of the arrow H in the figure.

Furthermore, because $G>D2$ is satisfied, the mold configuration of the gear portion is on the left side mold in FIG. 6, and therefore, the right side mold structure, which is complicated due to the provision of the coupling configuration, is simplified, and therefore, the durability of the mold is improved.

The dimensional relations apply in the case in which the relation between the male shaft 17 and the female shaft 18 is reversed, that is, in the case that the photosensitive drum is provided with the recess 18a while the main assembly side of the apparatus is provided with the projection 17a (the diameter of the circumscribed circle of the polygonal of the recess 18a is C). The same advantages are provided in such a case, too.

Examples of the numerical ranges of them are as follows:
D1=approximately 10 mm–60 mm
G=approximately 10 mm–70 mm
F=approximately 5 mm–70 mm
C=approximately 3 mm–70 mm
D2=approximately 9 mm–59 mm.

The sizes may be selected within these ranges so as to satisfy the above-described relations.

In this example, sizes are as follows:
D1=approximately 30 mm
G=approximately 31 mm
F=approximately 16 mm
C=approximately 14 mm.

However, the present invention is not limited to these sizes

Figure 12:
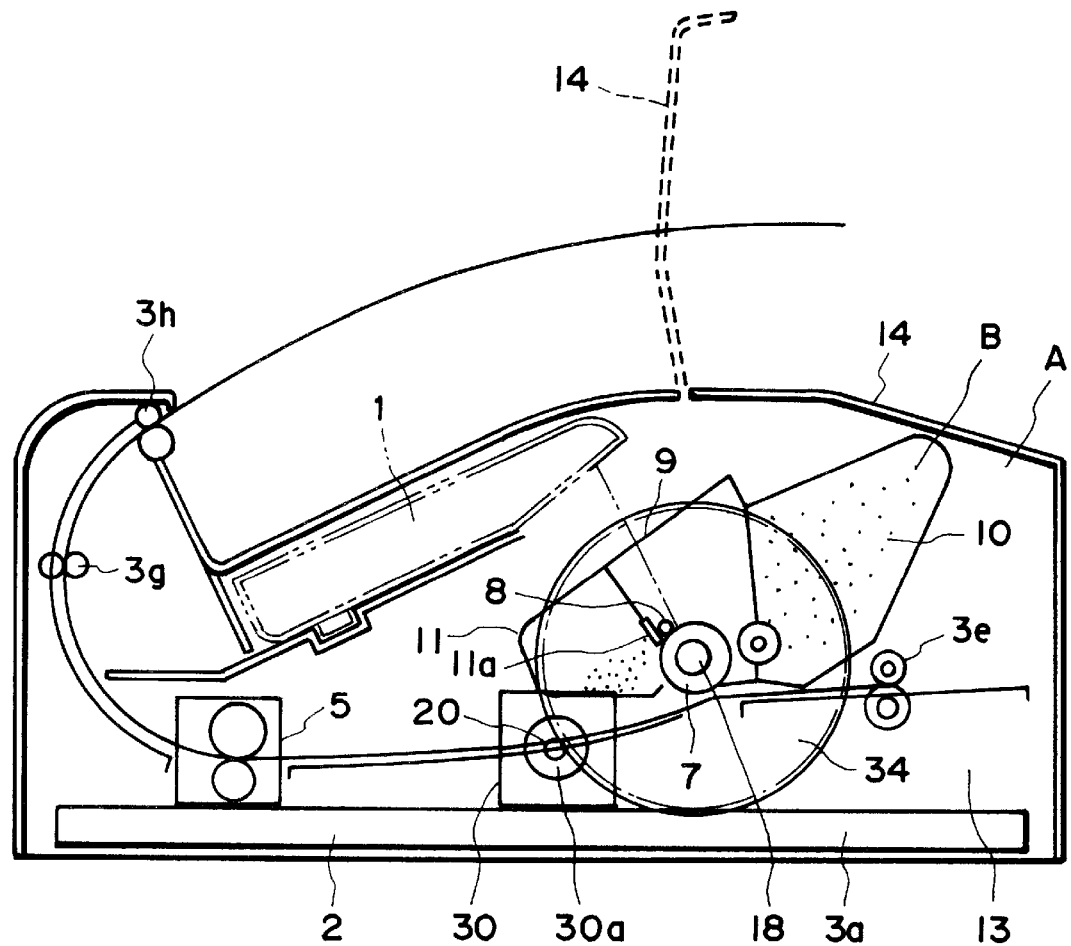
FIG. 12 is a sectional view of a driving system of a main assembly of an electrophotographic image forming apparatus according to an embodiment of the present invention.
Figure 13:
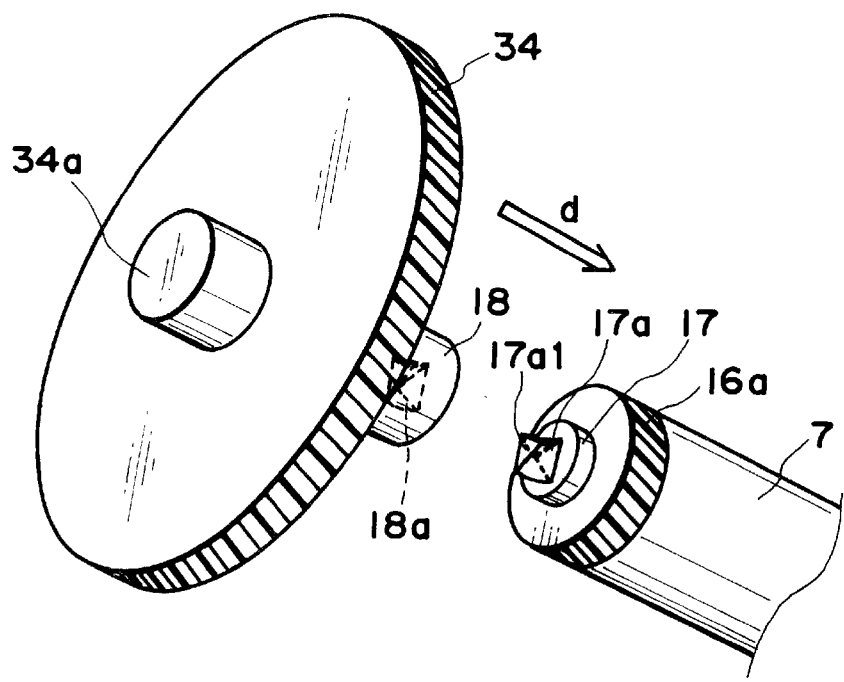
FIG. 13 is a perspective view of a coupling of a main assembly of the device and a coupling of the process cartridge, according to an embodiment of the present invention.
Figure 14:
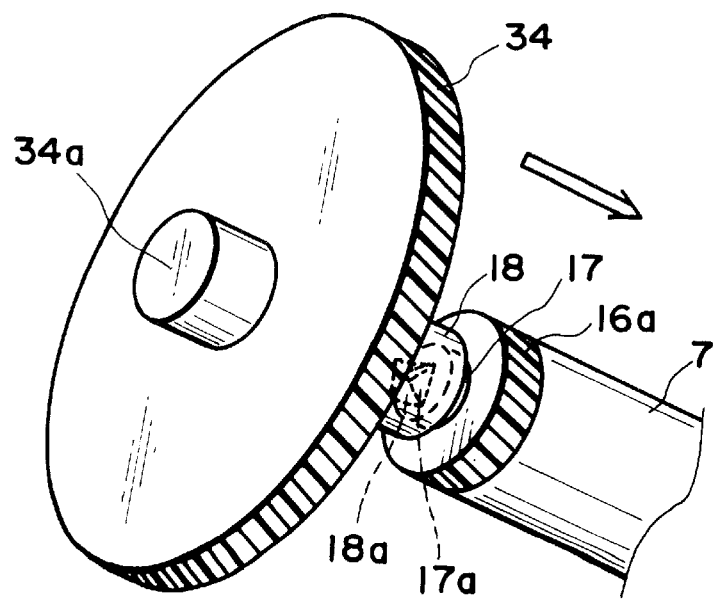
FIG. 14 is a perspective view of a coupling of a main assembly of a device and a coupling of a process cartridge according to an embodiment of the present invention.

On the other hand, the main assembly 13 of the image forming apparatus is provided with main assembly coupling means. The main assembly coupling means includes a female coupling shaft 18 (circular column configuration) at a position in alignment with the photosensitive drum rotation axis when the process cartridge B is inserted. The female coupling shaft 18 is a driving shaft integral with the large diameter gear 34 for transmitting the driving force from the motor 30 to the photosensitive drum 7, as shown in FIG. 12. The female shaft 18 is projected from a lateral edge of the gear 34 at a rotation center of the gear 34 (FIGS. 13, 14). In this example, the large diameter gear 34 and the female coupling shaft 18 are integrally molded.

The gear 34 in the main assembly side is a helical gear. The tooth thereof has such an inclination angle that a thrust is produced in the direction of moving the female shaft 18 toward the male shaft 17 when the driving force is transmitted thereto from the helical gear 20 fixed to the shaft 30a of the motor 30. Therefore, when the motor 30 is driven upon image formation, the thrust is effective to move the female shaft 18 to the male shaft 17 to establish firm coupling between the recess 18a and the projection 17a. The recess 18a is provided at the rotation center of the female shaft 18 at a end of the female shaft 18.

In this embodiment, the driving force is transmitted directly from the gear 20 fixed to the motor shaft 30a to the gear 34, a gear train may be used for deceleration and driving transmission, or use may be made of a belt and pulley, a pair of friction rollers or a combination of a timing belt and a pulley.

Figure 15:
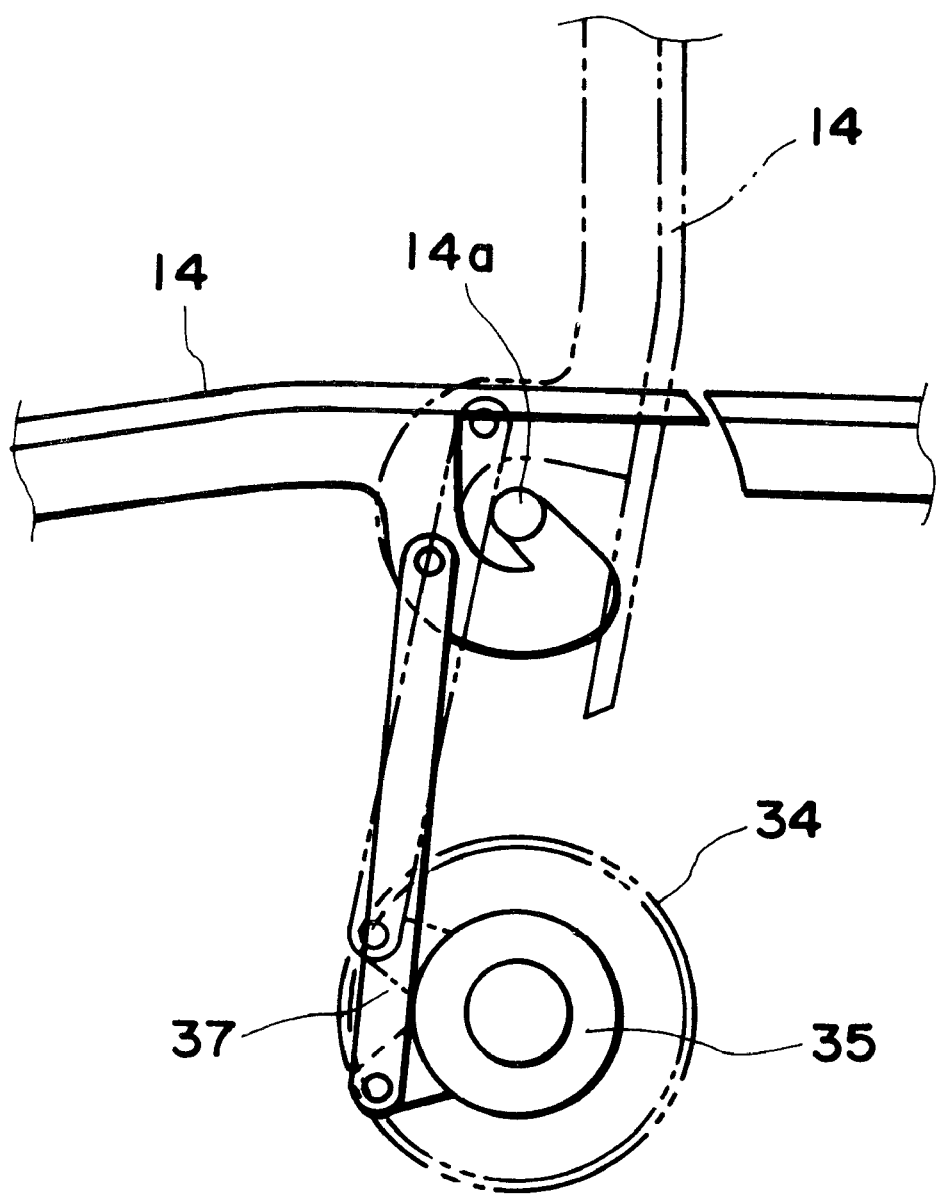
FIG. 15 is a sectional view of a structure of a coupling portion and a cover of the main assembly of the device according to an embodiment of the present invention.
Figure 16:
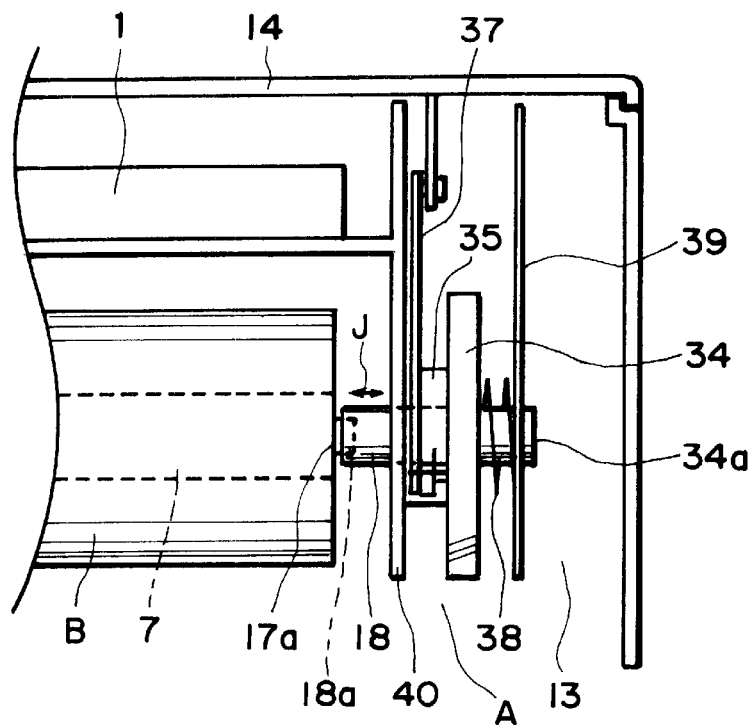
FIG. 16 is a side view of a structure of a female coupling shaft according to an embodiment of the present invention.
Figure 17:
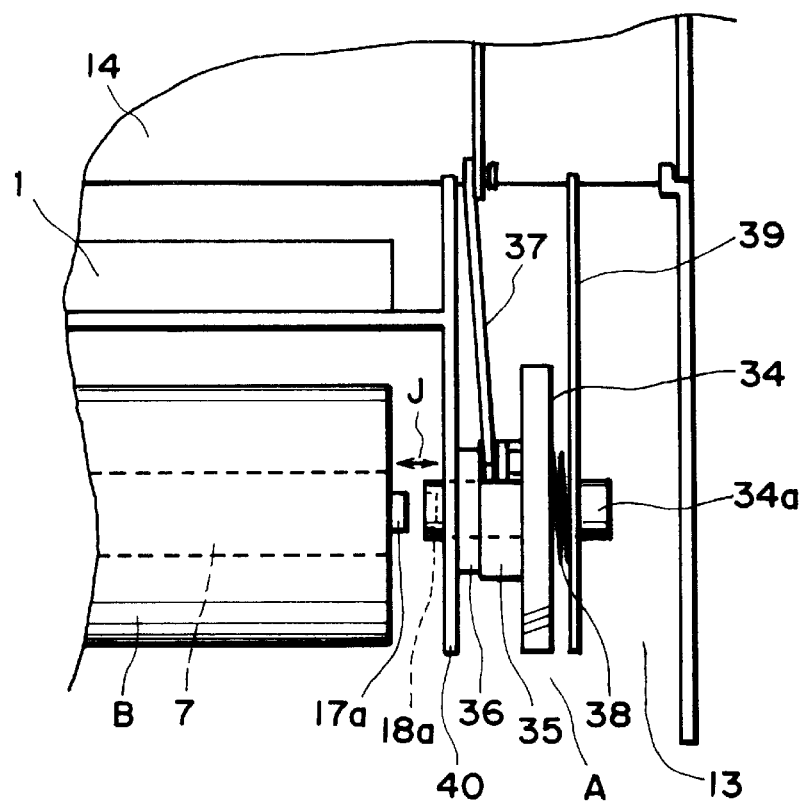
FIG. 17 is a side view of a structure of a female coupling shaft upon process cartridge mounting-and-demounting relative to the main assembly according to an embodiment of the present invention.

Referring to FIG. 15 to FIG. 17, the description will be provided as to the structure for engaging the recess 18a and projection 17a in interrelation with the closing operation of the openable cover 14.

FIG. 15 is a view as seen in a direction of the axis of the photosensitive drum 7, wherein an outer cam 35 and an inner cam 36 (FIG. 17 reference) are disposed between the gear 34 and the photosensitive drum 7 (unshown), and the cover 14 of the image forming apparatus and the outer cam 35 are connected by a rod 37, thus constituting a moving means. Designated by 40 is a side plate provided in the main assembly 13. Referring to FIGS. 16 and 17, designated by 34a is a shaft supporting portion for supporting the gear 34 on the side plate 39.

FIG. 16 is a view as seen from the right side. When the cover 14 is closed, the rod 37 and the outer cam 35 and so on take the position shown in this figure, and they are coupled by the coupling projection 17a and the recess 18a to permit driving force transmission from the gear 34 to the photosensitive drum 7. When the cover 14 is opened, the cam 35 is pulled through the rod 37, as shown in FIG. 17, and therefore, the cam 35 is rotated to contact the inner cam 36, thus moving the gear 34 away from the photosensitive drum 7. At this time, the gear 34 and the female coupling shaft 18 are pushed by the outer cam 35 to push the spring 38 mounted between itself and the fixing plate 39 and move in the same direction, so that the recess 18a becomes spaced from the projection 17a to release the coupling, by which the cartridge B demounting is enabled. When the cover 14 is closed, the cam 35 rotates in the opposite direction and is pushed by the spring 38 so that the gear 34 is reset to the position shown in FIG. 16 to enable the driving transmission. With this structure, the mounting-and-demounting of the cartridge B and the drive transmission are disabled and enabled in response to the opening and closing of the cover 14.

In this example, the cover 14 is opened and closed when the process cartridge B is mounted to or demounted from the main assembly of the apparatus. In interrelation with the opening and closing of the cover 14, the recess 18a moves in a horizontal direction (arrow j direction). When the process cartridge B is mounted or demounted relative to the main assembly, the coupling (between 17a and 18a) between process cartridge B and the main assembly 13 of the apparatus is assuredly disengaged. Therefore, the mounting-and-demounting of the process cartridge B relative to the main assembly 13 can be smoothly carried out. In this example, the recess 18a is urged toward the process cartridge B by the spring 38. Therefore, even if the projection 17a and the recess 18a are not aligned, and therefore abutment occurs therebetween, and are not engaged, they are engaged instantaneously upon the rotation of the recess 18a.

A description will be provided as to the configurations of the projection 17a and the recess 18a which are the engaging portion of the coupling means.

The female coupling shaft 18 provided in the main assembly 13 is movable toward the rotational shaft, as described hereinbefore, but is not movable in the radial direction. The process cartridge B is mounted in the main assembly 13 of the apparatus such that it is movable in the longitudinal direction and radial direction of the photosensitive drum 7.

More particularly, when the process cartridge B is mounted in the main assembly 13 of the device, a portion of the drum shaft 25a (bearing 12c2) (FIGS. 4 and 9) formed on the flange 25 mounted adjacent the other longitudinal end of the photosensitive drum 7 is received by the (U groove) 15b (FIG. 5) of the main assembly 13 and is engaged therewith without gap, so that it is correctly positioned, and the spur gear 25b integrally molded with the flange 25 is meshed with a gear (not shown) for transmitting the driving force to the transfer roller 4. On the other hand, at the longitudinal end of the photosensitive drum 7 (driving side), the projection 24a of the cleaning frame 12c is supported by the recess 15d of the main assembly 13. By closing the cover 14, the recess 18a is moved in a horizontal direction and is received by the projection 17a (FIG. 8 (a)).

The positioning and driving transmission at the driving side (coupling side) are as follows.

When the main assembly driving motor 30 is rotated, the female coupling shaft 18 is moved toward the male coupling shaft 17 (arrow d in FIG. 13), and they are engaged when the phases of the projection 17a and the recess 18a are matched (in this example, since the projection 17a and recess 18a have substantially equilateral triangular configurations, the phases thereof matches at every 120°). Then the rotation force is transmitted from the main assembly 13 of the apparatus to the process cartridge B (from the state of FIG. 17 to the state of FIG. 16).

Since the sizes of the equilateral triangles are different, more particularly, the size of the triangle of the recess 18a is larger than that of the projection 17a (as shown in FIG. 8 (a)), the projection 17a is smoothly engaged into the recess 18a with the gap therebetween. The accuracy of the positioning between the male coupling shaft 17 and female coupling shaft 18 may be rough at the time of engaging action.

In this example, the projection length of the circular projection 24a is larger than that of the projection 17a (FIG. 9). Therefore, when the projection 17a and the recess 18a are engaged, the inside surface of the circular projection 24a is engaged with the outer peripheral surface of the female coupling shaft 18 to guide the engagement therebetween.

When the female coupling shaft 18 is rotated with the projection 17a engaged with the recess 18a for image formation, the inside surfaces 18a1 of the recess 18a are engaged to the apex lines 17a1 of the equilateral triangular prism of the projection 17a (as shown in FIG. 8) to permit the transmission of the driving force. At this time, the male shaft 17 instantaneously moves so that the inside surfaces 18a1 of the recess 18a contact the edge lines 17a1 of the projection 17a at regular positions (equidistantly) (from the state of FIG. 8 (a) to the state of FIG. 8 (b)). Since the projection 17a and the recess 18a are both substantially equilateral triangles, the male shaft 17 and the female shaft 18 are brought into the coaxial state with each other with uniform contact forces. Immediately after the projection 17a is brought into engagement with the recess 18a, the rotation center of the projection 17a is not aligned with the rotation center X2 of the recess 18a (FIG. 8 (a)). However, when the recess 18a starts to rotate, and it contacts to the edge line 17a1 of the projection 17a at 3 points (lines), the rotation centers X1 and X2 are substantially aligned.

Thus, the coupling shaft 17 and 18 are automatically axis aligned by the rotation of the motor 30 (self-alignment). Furthermore, by the driving force transmission to the photosensitive drum 7, the process cartridge B is rotated, by which the abutment portion 12c1 provided on the top surface of the cleaning frame 12c of the process cartridge B (FIGS. 3 and 4) is abutted to the abutment portion 13a (FIG. 1) fixed to the main assembly 13 of the image forming apparatus, so that the process cartridge B is precisely positioned to the main assembly A of the image forming apparatus.

When the process cartridge is not driven (non-image formation), the gap is provided between the projection 17a and recess 18a in the rotation radius direction (radial direction), and the engagement between the couplings and the mounting and demounting of the process cartridge relative to the main assembly are made easier. Additionally, the contact force at the coupling engagement portion is stabilized, so that wobble and vibration at this position can be suppressed.

In this example, the coupling projection and recess have substantially equilateral and triangular configurations, but a similar advantage can be provided if the configuration is equilateral and polygonal. The use of a equilateral polygonal configuration is preferable since the positioning is correct, but any polygonal configurations are usable if the engagement is possible and pulling engagement is possible.

When a comparison is made between the coupling projection and recess, the projection is easily damaged, and the strength thereof is smaller than the recess. In this example, the coupling projection is provided in the process cartridge B which is exchangeable, and the coupling recess is provided in the main assembly 13 which is required to have a higher strength.

The process cartridge B of embodiment is summarized as follows. The process cartridge B of this example is detachably mountable relative to a main assembly of an electrophotographic image forming apparatus A comprising a motor 30, a main assembly gear 34 for receiving the driving force from the motor, and a twisted polygonal hole 18a integrally rotatable with the main assembly gear, the hole being formed at the center of the main assembly gear, the electrophotographic image forming apparatus A being capable of forming an image on the recording medium 2. The process cartridge comprises the electrophotographic photosensitive drum 7, the process means actable on the electrophotographic photosensitive drum (charging roller 8, developing roller 10, cleaning blade 11a), and a twisted polygonal prism projection (projection 17a) engageable with the twisted polygonal hole of the main assembly, the projection is provided at the end of the electrophotographic photosensitive drum. The process cartridge B is mounted to the main assembly 13 of the main assembly, and the polygonal prism projection 17a is engaged with the recess of the main assembly, and when the gear 34 is rotated, the rotational driving force is transmitted to the photosensitive drum.

The projection 17a is projected from the end of the shaft portion 17 projected outwardly in the longitudinal direction of the drum from the rotation center position of the drum 7. The shaft portion functions to rotatably support the drum 7 on the cartridge frame 12c.

A hole 17a2 is formed in the end surface of the projection 17a so as to be engageable with the projection 18a4 of the recess 18a with a play.

The shaft portion 17 is provided at the central portion of the helical gear 16a, and at the opposite end from the helical gear 16a side, an engaging portion 16b for engagement with the inside surface of the electrophotographic photosensitive drum 7 is provided. The projection 17a, the shaft portion 17, the helical gear 16a, and the engaging portion 16b are integrally molded of a resin material. The helical gear functions to transmit the rotation force to the developing roller 10a as the process means.

Furthermore, there is provided a circular outer wall 24a enclosing the polygonal prism projection 17a, or an arcuate configuration outer wall along a part of the polygonal prism projection. The outer wall 24a functions as a guide when the engagement between the hole 18a and the projection 17a occurs by relative movement therebetween.

The outer diameter D1 of the electrophotographic photosensitive drum 7, the outer diameter F of the shaft portion 17, and the diameter C of the circumscribed circle of the polygonal prism projection 17a, satisfy $D1 > F \geq C$.

The outer diameter F of the shaft portion 17, the diameter C of the circumscribed circle of the polygonal prism projection 17a, the dedendum diameter G of the gear 16a of the electrophotographic photosensitive drum 7, and the inner diameter D2 of the electrophotographic photosensitive drum 7, satisfy $G > D2$ and $G > F \geq t$.

The outer diameter D1 of the electrophotographic photosensitive drum 7, and the dedendum circle diameter L of the main assembly gear 34, L is preferably not less than approximately 1.0 times D1 and not more than 5.0 times D1. The relation is properly selected by one skilled in the art in consideration of the space of the main assembly of the device and the desired image quality. The dimensions are not limiting. In this example, it is approximately 3 times.

The module of the main assembly gear 34 is approximately 0.4–0.7. The dedendum diameter L of the main assembly gear 34 of the device is approximately 30 mm–150 mm, and the number of teeth of the main assembly gear 34 is approximately 40 teeth to 400 teeth. They are properly selected by one skilled in the art in consideration of the space in the main assembly and desired image quality. The figures are not limiting. In this example, the module of the gear 34 is approximately 0.5, and L is approximately 100 mm, and the number of the teeth of the gear 34 is 200 teeth.

The positioning of the process cartridge B relative to the main assembly 13 during the image formation (driving transmission) is summarized as follows.

First, the process cartridge B is positioned by the bearing 12 being snugly fitted in the U groove 15d during the non-image formation. The projection 24a is simply supported by the receptor portion 15d, and simultaneously, the projection 18a4 is inserted into the hole 17a2 after the female shaft 18 is moved toward the photosensitive drum 7, so that position of the process cartridge B in the main assembly A is roughly determined. During the image formation, the process cartridge B is positioned by the projection 17a being attracted by the recess 18a of the main assembly 13 and being engaged with the projection 17a. Namely, during the image formation, the process cartridge B is positioned by the U groove 15b at one longitudinal end, and by the recess 18a at the other end. In this example, the photosensitive drum 7 is movable in the longitudinal direction (approximately 0.1 mm–1.0 mm). When the projection 17a is attracted to the recess 18a, the end portion 16c of the drum flange 16 (FIGS. 7 and 8 and FIG. 9) is brought into contact to the end portion 24b of the bearing 24. The process cartridge B, which is mounted movably relative to the main assembly side plate or mounting guides 15a and 15c with play of approximately 0.1–3 mm) in consideration of assembly tolerance, is pulled toward the photosensitive drum 7 in the longitudinal direction and in the radial direction, thus moving in an inclined upward direction. In the case the end portion 16c is in contact with the end portion 24b at the beginning, or when the photosensitive drum 7 does not have a play in the longitudinal direction, the process cartridge B is pulled to the photosensitive drum 7 immediately in its longitudinal direction and in the radial direction, thus moving in an upward inclined direction.

During the image formation operation, the process cartridge B receives the rotation force in the same direction as the rotation direction of the photosensitive drum 7. By this rotation force, the contact portion 12c1 is contacted to the fixed portion 13a.

Accordingly, the process cartridge B is correctly positioned relative to the main assembly 13 of the apparatus in both the longitudinal direction and the radial direction during the image formation operation.

Figure 21:
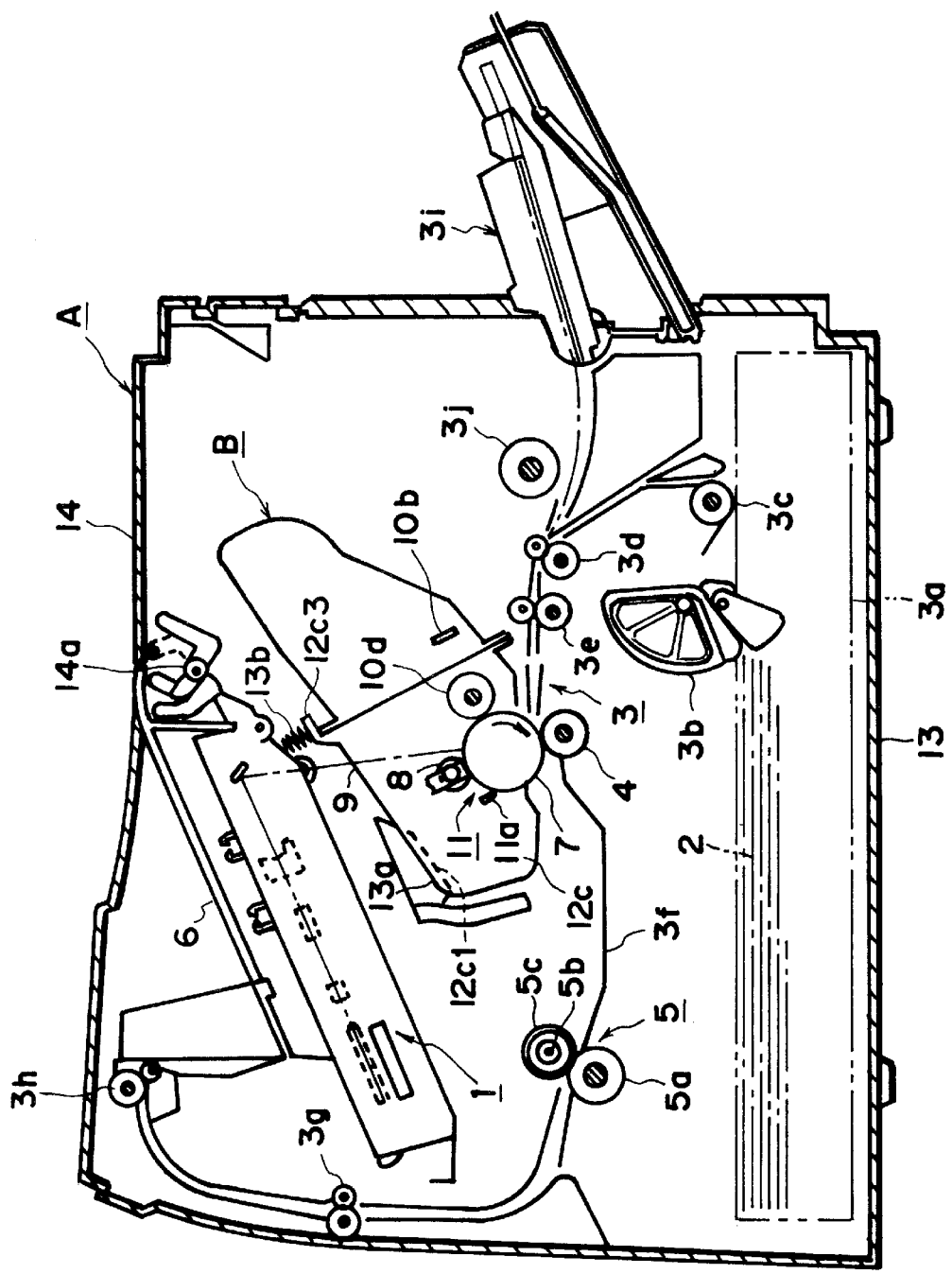
FIG. 21 is a sectional view of an electrophotographic image forming apparatus according to an embodiment of the present invention.

When the process cartridge B is pushed by an elastic member as in FIG. 21 example, the process cartridge B may not move in the longitudinal direction of the drum 7, depending on the strength of the elastic force provided by the elastic member. Even in that case, when the drive transmission starts, the process cartridge B moves in the radial direction (substantially upward) so that it is correctly positioned relative to the main assembly. In this case, even if the drum 7 does not involve the play in the longitudinal direction, the process cartridge B is correctly positioned relative to the main assembly.

Referring back to FIG. 18, it will be understood that the coupling mechanism is summarized as follows. The driving rotatable member 18a for receiving a driving force from the motor is provided with a twisted recess or projection having a non-circular cross-section and substantially coaxial with a rotation axis X2 of the drive rotatable member 18a. The member to be driven or the image bearing member is provided with a twisted projection or recess 17a provided at a longitudinal end of the image bearing member, having a non-circular cross-section and substantially coaxial with a rotation axis of the image bearing member, wherein the projection or recess of the image bearing member 17a has such a dimension and configuration that it can take a first relative rotational position (FIG. 18, (a), for example) with respect to the recess or projection of the driving rotatable member 18a in which relative rotational movement therebetween is permitted, and a second relative rotational position (FIG. 18, (b), for example) with respect to the recess or projection of the driving rotatable member 18a in which relative rotational movement is prevented in one rotational direction (indicated by arrows in FIG. 18, (b)), while the rotation axis X2 of the driving rotatable member 18a and the rotation axis X1 of the image bearing member are substantially aligned with each other.

It is preferable that the recess or projection of the driving rotatable member and the projection or recess of the image bearing member are contacted substantially at three twisted points (lines). It is further preferable that the three points constitute a substantially equilateral triangle.

Embodiment 2

Figure 19:
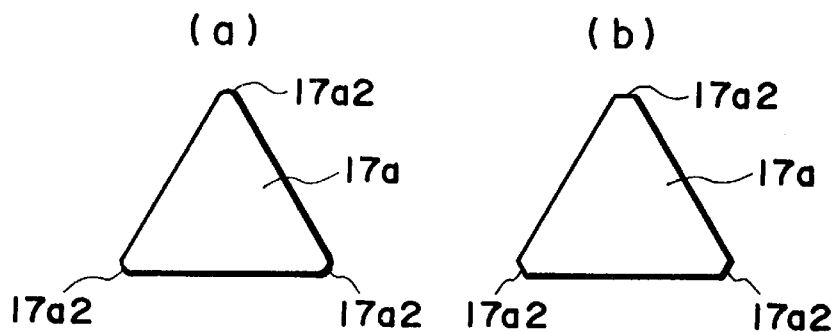
FIGS. 19(a) and (b) are sectional views of a coupling projection according to a one embodiment of the present invention.

Referring to FIG. 19, a description will be provided as to embodiment 2 of the projection 17a of the male coupling shaft 17. The fundamental structures of the process cartridge and the image forming apparatus are the same as in embodiment 1, and therefore, the same reference numerals as in embodiment 1 are assigned to the elements having the corresponding functions, and detailed descriptions thereof are omitted for simplicity.

The coupling projection 17a of FIG. 19 is different from that in embodiment 1 in that the apexes 17a2 of the substantially equilateral polygonal prism shape of the projection (it is substantially equilateral triangle shape in FIG. 19) are beveled. The beveling includes rounding as shown in FIG. 19, (a) and straight cutting as shown in FIG. 19, (b).

With this structure, the collapse of the apexes of the projection 17a during handling of the process cartridge B can be avoided. During the driving, the deformation and deflection of the apexes due to insufficient strength can be avoided. Thus, the decrease of the alignment accuracy between the male shaft 17 and the female shaft 18 can be prevented, and wobble and vibration at the coupling portion can be avoided.

In FIG. 19, (a), as will be understood when this configuration is introduced in the projection 17a of FIG. 18, (b), the portions contacted to the inner surface of the recess is not the outermost points of the configuration of FIG. 19, (a), but is portions slightly deviated therefrom (at each apex portion). From the standpoint of axis alignment, it is preferable that such deviated three contact points constitute a substantially equilateral triangle.

Similarly, in FIG. 19, (b), it is preferable that the three points constitute a substantially equilateral triangle.

For the same reason, in a polygonal projection (polygonal recess) examples, it is preferable that the projection and recess are contacted at three points which constitute a substantially equilateral triangle, from the standpoint of the axis alignment.

In the case of FIG. 19, (a), each contact point (actually a twisted line) in the cross-section may have a certain width.

In such a case, the centers or one side ends of the widths are deemed as the points to constitute the triangle.

Embodiment 3

Figure 20:
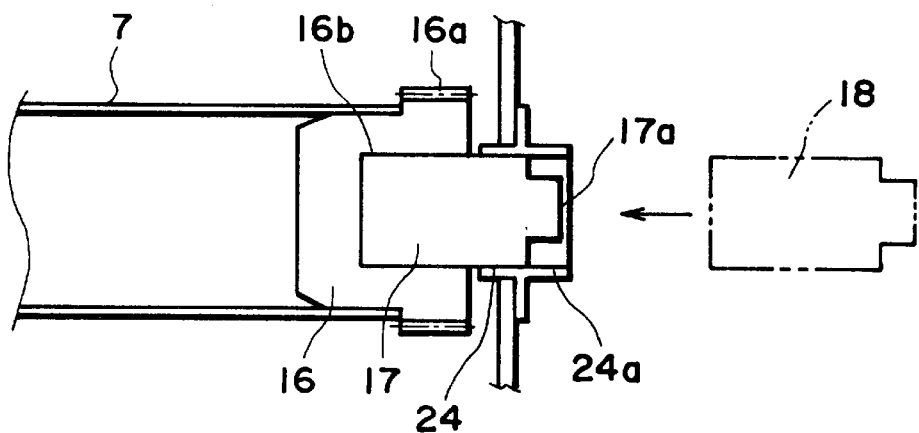
FIG. 20 is a sectional view of a process cartridge side coupling portion according to an embodiment of the present invention.

Referring to FIG. 20, a description will be provided as to embodiment 3 of the projection of the male coupling shaft 17. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In embodiment 1, the flange 16 of the photosensitive drum 7 and the male coupling shaft 17 are integral, but they may be separate members, which are incorporated in the process cartridge B, respectively.

When the male coupling shaft 17 and the flange 16 are separate members, as in this example, the male coupling shaft 17 can be mounted into the engaging portion 16b of the flange 16 by press-fitting or the like after the photosensitive drum 7 with the flange 16 is incorporated in the frame 12c, so that the photosensitive drum 7 may not be assembled into the frame 12c in an inclined direction.

Embodiment 4

Referring to FIG. 21, a description will be provided as to embodiment 4 having a different positioning structure of the process cartridge to the main assembly of the image forming apparatus, using the coupling structure of the present invention. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

As shown in FIG. 21, the main assembly 13 of the image forming apparatus is provided with an elastic member 13b for urging the process cartridge B in the rotation direction of the photosensitive drum 7. The elastic member 13b contacts the contact portion 12c3 of the cleaning frame 12c of the process cartridge B while the process cartridge B is in the main assembly in place, and it applies the rotation force in the same direction as the rotation direction of the photosensitive drum 7 to the process cartridge B. The process cartridge B receiving the rotation force tends to rotate in the rotation direction of the photosensitive drum 7 (clockwise direction in FIG. 21), but is stopped by the abutment between the abutment portion 12c1 of the frame 12c and the abutment portion 13a of the main assembly. This is effective to prevent the vibration, in the rotation direction, of the process cartridge B urged in the rotation direction of the photosensitive drum 7 by the coupling driving force, due to the internal load variation or the like. The contact portion 12c3 is provided at each of two positions, namely, adjacent one end side and other end side in the longitudinal direction of the photosensitive drum 7 on the top surface of the cleaning frame 12c (FIGS. 3 and 4).

Embodiment 5

Referring to FIG. 22, another embodiment of the coupling structure will be described. The fundamental structures of the process cartridge and the image forming apparatus are substantially the same as in embodiment 1. The same reference numerals as in embodiment 1 are assigned to the elements having the corresponding functions, and detailed descriptions thereof are omitted for simplicity.

In this example, as shown in FIG. 22, the projection 17a of the male coupling shaft 17 and the recess 18a of the female shaft 18 has a substantially rectangular configuration section which is twisted in the rotation direction of the shaft. Similarly to embodiment 1, the durable coupling recess 18a is provided in the main assembly 13 of the image forming apparatus. With this structure, when the driving is transmitted while the coupling is in engagement, the force is produced so that the female coupling shaft 18 pulls the male shaft 17 in the axial direction due to the twisting direction thereof, by which the projection end surface 17a1 of the male coupling shaft 17 is abutted to the recess bottom surface 18a1 (or, the male shaft end surface 17b is abutted to the end surface 18b of the female shaft).

Since the position of the process cartridge B is constant in the direction of the coupling shaft in the main assembly A of the image forming apparatus during the driving operation, the vibration of the process cartridge can be suppressed.

In this embodiment, the hole 17a2 has a rectangular cross-section, and the projection 18a4 has a rectangular parallelopiped configuration having a size a little smaller than the hole 17a2. In this embodiment, a part of the recess 18a may be expanded outwardly.

In this example, the cross-sectional configurations of the projection 17a of the coupling shaft and the recess 18a are substantially rectangular configuration, but another polygonal prism shape is usable if the engagement is established when the coupling recess is rotated.

When the process cartridge B is demounted from the main assembly, the motor 30 may be rotated in the opposite direction, the coupling engagement is automatically released due to the thrust between the gear 33 and the helical gear 34. In this case, there is no need of using the coupling release mechanism as in embodiment 1.

Embodiment 6

Figure 23:
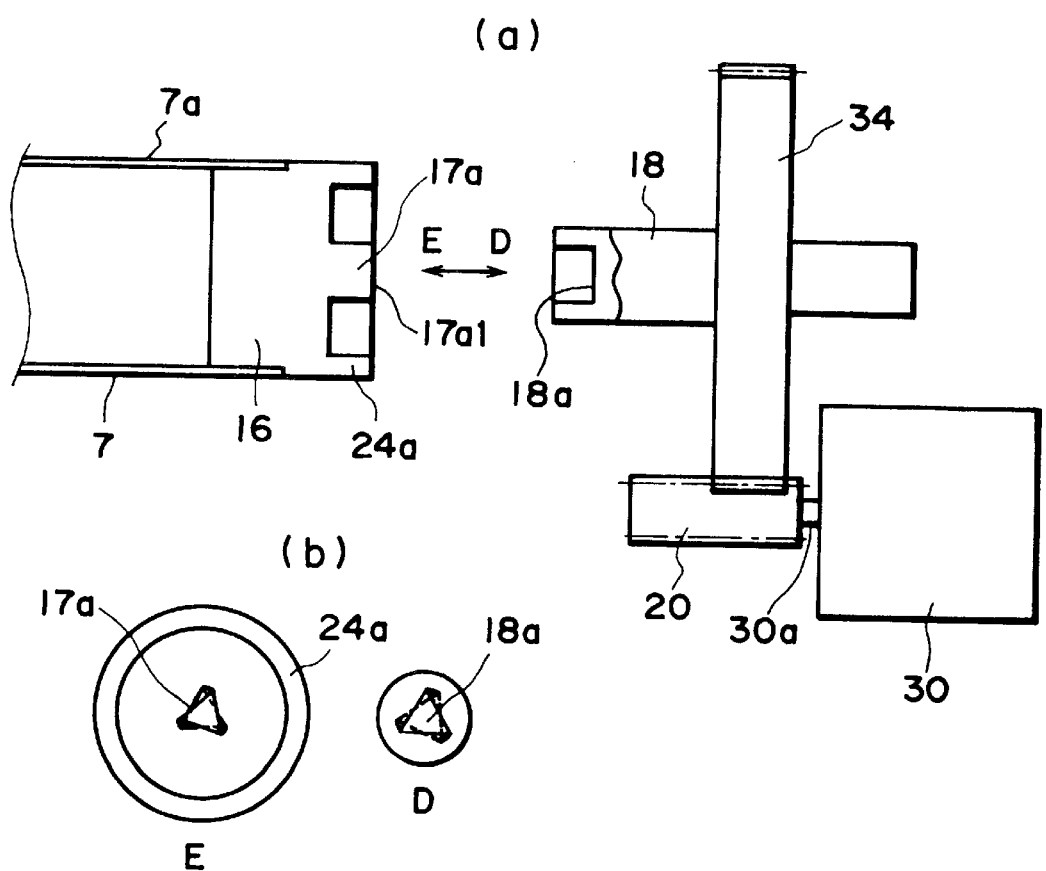
FIGS. 23(a) and (b) are a cross-sectional view and top plan view of a male shaft in the form of a twisted triangular prism provided on the process cartridge and an engageable female shaft provided in the main assembly of a device, according to an embodiment of the present invention.

Referring to FIG. 23, a description will be provided as to a further embodiment. The embodiment of FIG. 23 is different from embodiment 1 in that the gear is not provided on the drum flange 16.

The coupling structure shown in FIG. 3, (a) and (b), is such that the main assembly side coupling means is of a female coupling shaft 17 of polyacetal (POM), and the coupling means of the cartridge side engageable therewith is of a male coupling shaft 18 of POM. A cylindrical wall portion 24 concentric with the photosensitive drum 7 is formed integrally with the flange 16 is provided around the male coupling shaft 18. FIG. 3, (b) is views as seen in the directions D and E of FIG. 3, (a).

By the provision of a wall portion 24 having substantially the same height as the projection 18a around the male shaft 18, the projection 18a is not projected out beyond the cartridge frame, so that the damage of the end portion f the projection 18a can be prevented.

The cylindrical wall portion 24 may also function as a guide for facilitating the mounting of the process cartridge B to the image forming apparatus A (FIG. 6, guide c), as described in the foregoing.

Embodiment 7

Figure 24:
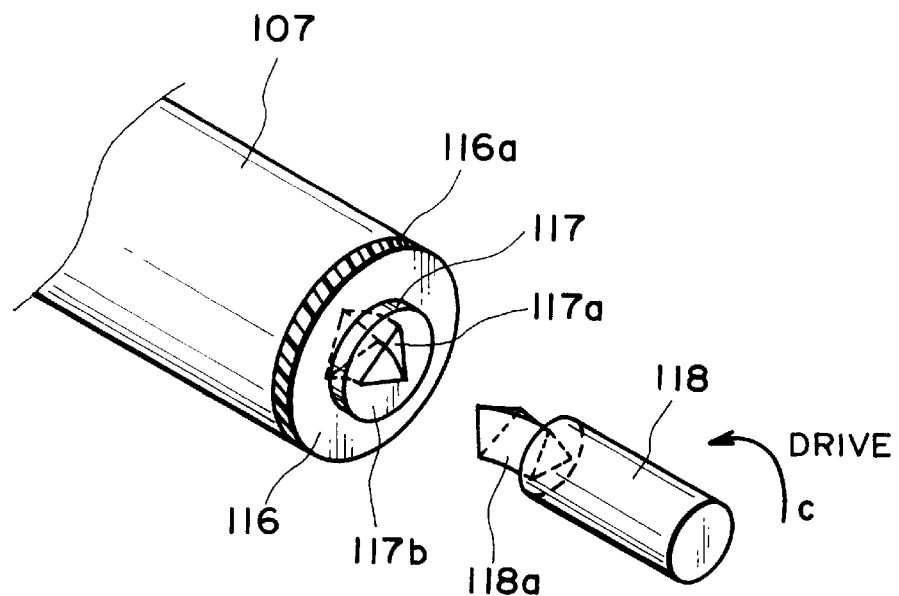
FIG. 24 is a perspective view of a twisted recess having a cross-section in the form of a triangle shape on the process cartridge, and a projection in the form of a complementary twisted triangular prism in the main assembly of the device, according to and embodiment of the present invention.
Figure 25:
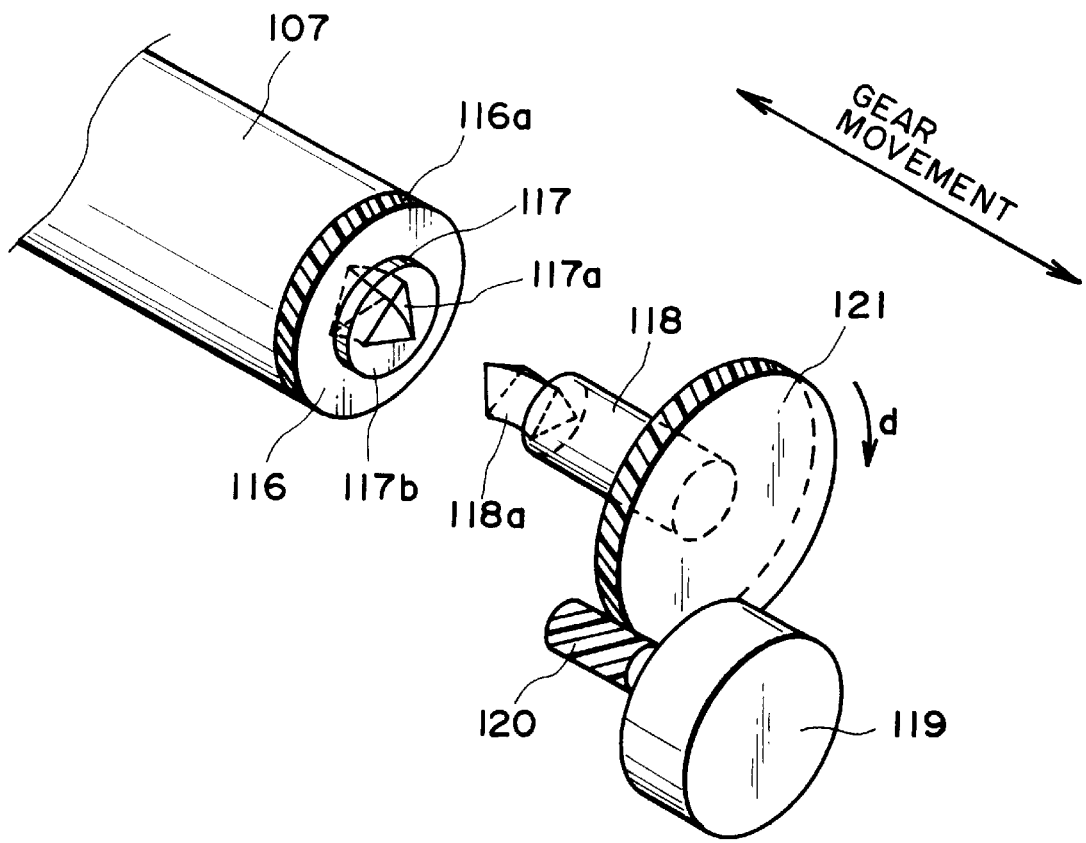
FIG. 25 is a perspective view of a driving mechanism of the coupling of FIG. 24.

Referring to FIGS. 24 and 25, another embodiment will be described. In this embodiment, as contrasted to the above-described embodiment, the drum flange 116 of the photosensitive drum 7 is provided with a female shaft 117, and the large diameter gear 121 of the main assembly 13 of the apparatus is provided with a male shaft 118. The rotation accuracy can be improved, with this structure, too.

As shown in FIG. 24, the substantially positive triangular prism of the projection 118a of the male coupling shaft 118 is twisted in the rotation direction, and the recess 117a of the female coupling shaft 117 is twisted correspondingly in the rotation direction. A seat 117b is provided at the end surface of the female coupling shaft 117.

By the twisting of the engaging portion in the rotation direction, the male coupling shaft 118 pulls the female shaft 117 until it is abutted to the seat 117b when the male coupling shaft 118 is rotated in the direction c for image formation while they are engaged. As a result, the combination therebetween is further assured.

When the process cartridge B is demounted from the main assembly 13, motor 119 may be rotated in the opposite direction indicated by arrow d, by which the engagement of the coupling is automatically released by the thrust produced by the meshing between the pinion gear 120 having the helical teeth and the transmission gear 121, as shown in FIG. 25.

In this example, if the tolerable transmission torque of the female shaft 117 is smaller than the tolerable transmission torque of the male shaft 118, the damage of the male shaft 118 can be prevented.

For example, the female coupling shaft provided in the cartridge is made of polyacetal (POM), and the male coupling shaft constituted in the main assembly is made of zinc die-cast. By doing so, even if an abnormal torque is produced, the damage of the male shaft is prevented since the tolerable transmission torque of the male coupling shaft of the main assembly side is large.

This embodiment is the same as embodiment 1 except that the female shaft is provided in the drum flange, and the male shaft is provided in the main assembly. Therefore, the embodiments of the electrophotographic image forming apparatus, the process cartridge, the drive transmission part and the electrophotographic photosensitive drum are the same as those of embodiment 1, except that the male shaft of the drum flange is replaced with the female shaft, and the female shaft of the gear of the main assembly is replaced with the male shaft, and therefore, the description of such embodiments are omitted for simplicity.

However, the process cartridge will be described briefly. It is a process cartridge B which is detachably mountable to a main assembly 13 of an electrophotographic image forming apparatus A. The electrophotographic image forming apparatus A comprises a motor 30 (119), the main assembly helical gear 34 (121) for receiving the driving force from the motor 30 (119), and a twisted triangular prism projection 118a integrally rotatable with the main assembly helical gear provided at the main assembly helical gear of the main assembly helical gear 34 (121). The electrophotographic image forming apparatus A operates to form an image on the recording medium. The process cartridge B comprises cartridge frames 12a, 12b and 12c, the electrophotographic photosensitive drum 7 (107), the charging roller 8 for charging the electrophotographic photosensitive drum 7 (107), the cleaning blade 11a for removing the residual toner from the electrophotographic photosensitive drum 7 (107), the developing roller 10d for developing the latent image formed on the electrophotographic photosensitive drum 7 (107), a twisted triangular hole 117a engageable with the projection 118a provided at a longitudinal end of the electrophotographic photosensitive drum 7 (107), wherein the process cartridge B is mounted to the main assembly, and when the main assembly helical gear 34 (121) is rotated with the hole 117a engaged with the projection 118a, the rotational force is transmitted from the main assembly helical gear 34 (121) to the drum 7 (121) while the hole 117a is kept pulled toward the projection 118a. The hole 117a is formed as a recess at a leading edge of the shaft portion 17 (117) provided at the central portion of the drum helical gear 16a (116a). The drum helical gear 16a (116a) functions to transmit the rotation force to the developing roller 10d. The shaft portion 17 (117) functions to rotatably support the electrophotographic photosensitive drum 7 (107) on the cartridge frame 112c. The drum helical gear 16 (116a) of the hole 117 and the shaft portion 17 (117) are integrally formed from resin material. Outer diameter D1 of the electrophotographic photosensitive drum 7 (107), the outer diameter F of the shaft portion, and the diameter C of the circumscribed circle of the hole configuration 117a, satisfy D1>F>C.

The outer diameter F of the shaft portion 17 (117), the diameter C of the circumscribed circle of the hole configuration, the dedendum diameter G of the gear 16a of the electrophotographic photosensitive drum 7, and the inner diameter D2 of the electrophotographic photosensitive drum 7, satisfy G>D2 and G>F>C. The outer diameter D1 of the electrophotographic photosensitive-drum 7 (107), and the dedendum circle diameter L of the main assembly gear 34 (121), L is preferably not less than approximately 1.0 times D1 and not more than 5.0 times D1. The module of the main assembly gear 34 (121) is approximately 0.4–0.7. The dedendum diameter L of the main assembly gear of the device is approximately 30 mm–150 mm, and the number of teeth of the main assembly gear 34 is approximately 40 teeth–400 teeth.

In this example, the direction of twisting of the projection 118a as seen from the photosensitive drum 7 (107) is the same as the rotation direction of the photosensitive drum 7 (107) in the direction from the base portion of the projection 118a toward the end, and that of the hole 117a is the same in the direction from the inlet of the hole 117a toward the inside thereof. The twisting direction of the drum flange 16a (116a) is opposite from the twisting direction of the hole 117a.

Embodiment 8

Figure 26:
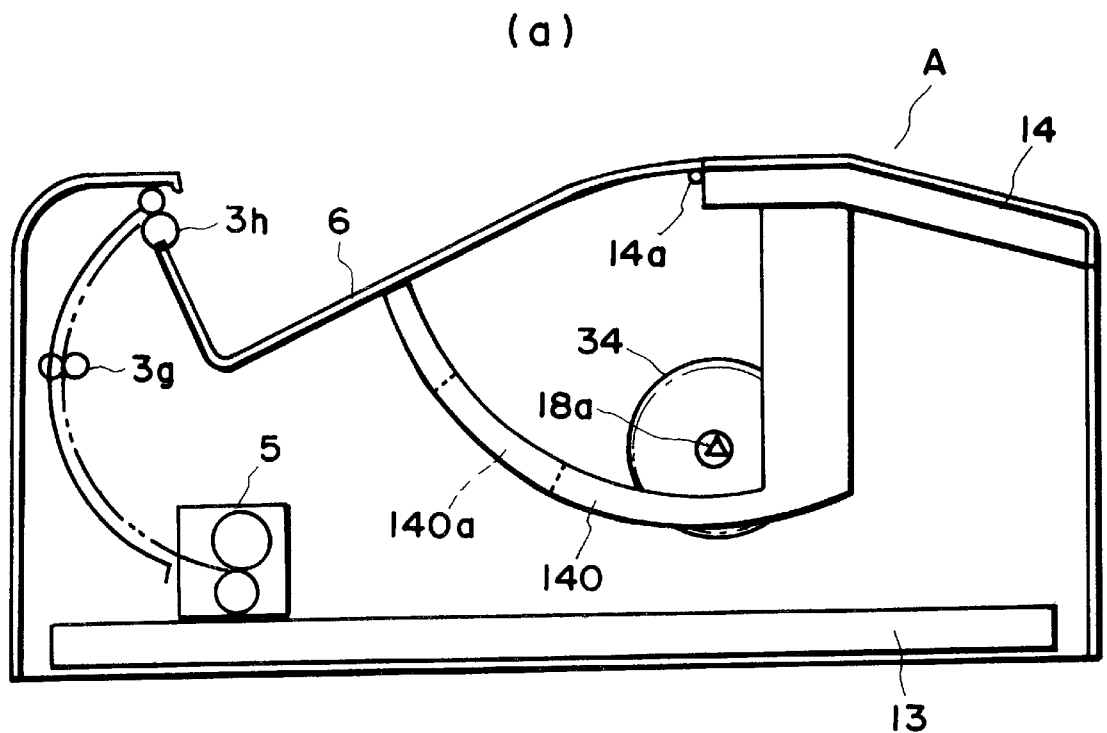
FIGS. 26(a) and (b) illustrate an interrelation mechanism of a driving means and an openable cover according to an embodiment of the present invention.
Figure 26:
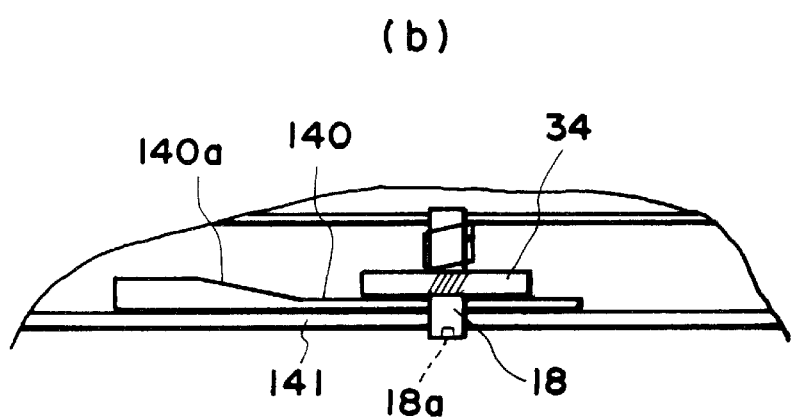
Figure 27:
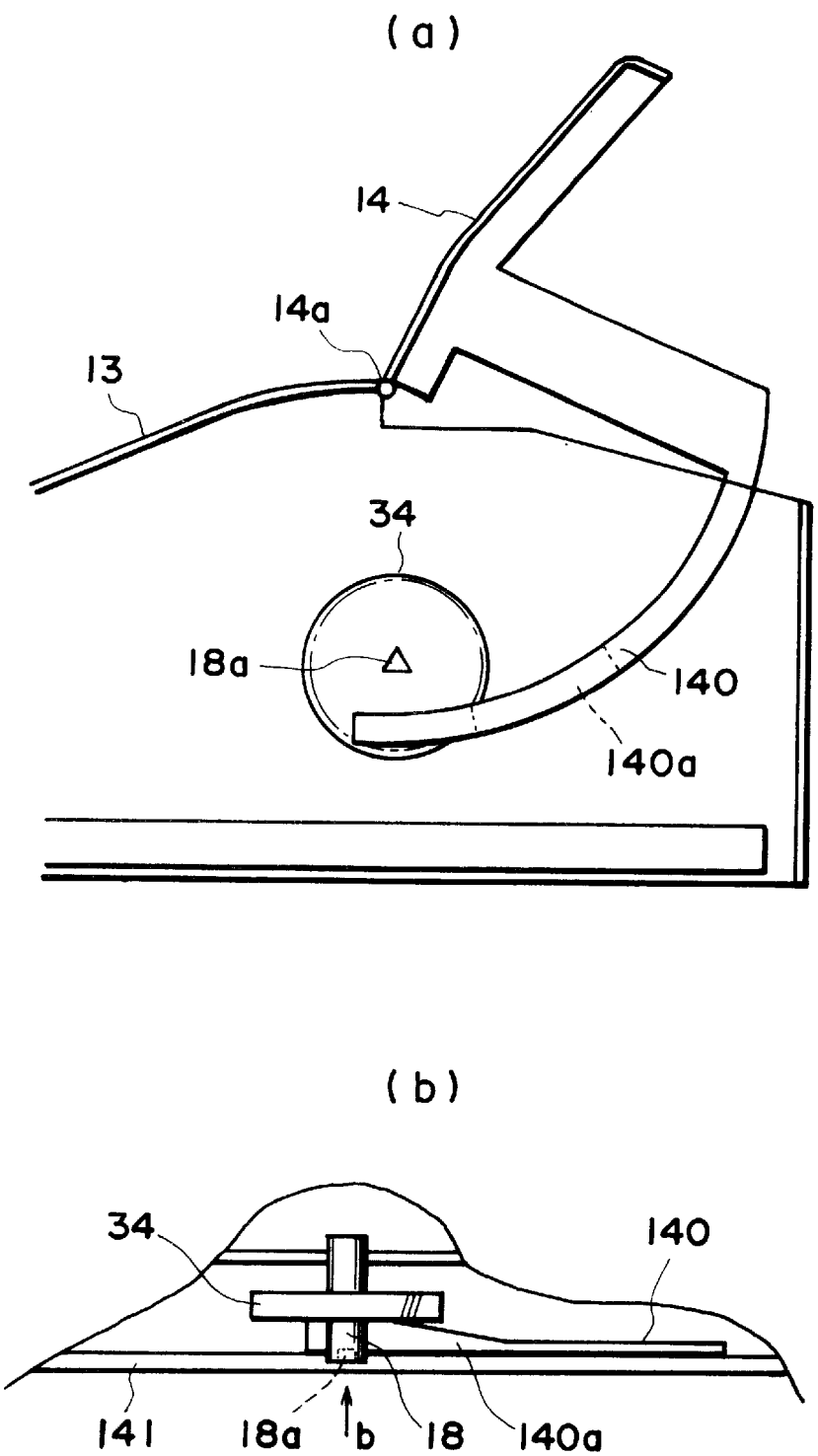
FIGS. 27(a) and (b) illustrate an interrelation mechanism of driving means and an openable cover according to an embodiment of the present invention. Preferred embodiments of the present invention.

In embodiment 1, when the cover 14 is opened, the rod 37 and the cam 35 are operated in interrelation therewith to release the engagement between the coupling projection 17a and the recess 18a. The coupling release structure may be as disclosed in FIGS. 26 and 27.

The openable cover 14 is provided with an arcuate releasing member 140 at the center of the shaft 14a, as shown in FIG. 6, (a), and the leading edge of the releasing member 140 is formed into a cam portion 140a having a gradually increasing thickness, as shown in FIG. 6, (b). As shown in FIG. 7, (a) and (b), when the cover 114 is opened to demount the process cartridge B, the cam portion 140a enters the space between the wall portion 141 and the gear 34 integral with the female shaft 18 to push the side surface of the gear 34 out in the direction indicated by arrow b in FIG. 27. By this, the female shaft 18 is retracted from the wall portion 141 so that the engagement with the male coupling shaft 17 of the photosensitive drum 7 is released to permit smooth demounting of the process cartridge B.

The member for mounting the releasing member 140 is not limited to the openable cover 14 if it is a member operated when the process cartridge B is mounted or demounted. When the drive transmission gear 34 is a helical gear, the releasing member 140 is not inevitable, and the coupling release is possible by the thrust produced by the helical gear.

Further Embodiment

In the first embodiment, the coupling of the photosensitive drum is constituted as a male shaft 17, and the coupling of the main assembly is constituted as a female shaft 18, but the female shaft and the male shaft may be exchanged. In such a case, the same advantageous effects in the rotation accuracy of the photosensitive drum can be provided (FIGS. 23 and 24). In this example, if the tolerable transmission torque of the female shaft of the photosensitive drum is smaller than the tolerable transmission torque of the male shaft of the main assembly, the damage of the male shaft of the main assembly can be prevented.

For example, the female coupling shaft provided in the cartridge is made of polyacetal (POM), and the male coupling shaft constituted in the main assembly is made of zinc die-cast. By doing so, even if an abnormal torque is produced, the damage to the male shaft is prevented since the tolerable transmission torque of the male coupling shaft of the main assembly side is large.

In the above-described embodiment, if a taper is formed at the end portion of the projection 17a or at the inlet portion of the recess 18a or at the both, combination between the projection 17a and the recess 18a is smoother.

In FIGS. 3, 6, 13, 14, 20, 23, and FIGS. 24–27, the hole 17a2, projection 18a4 and the arcuate configuration 18a 3 are omitted for simplicity of explanation.

Figure 34:
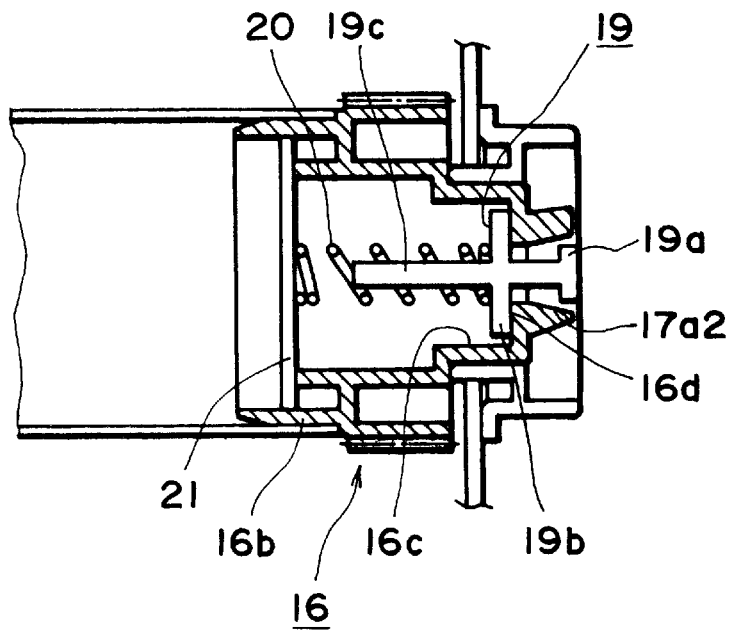
FIG. 34 is a sectional view of a female coupling recess according to a further embodiment.
Figure 35:
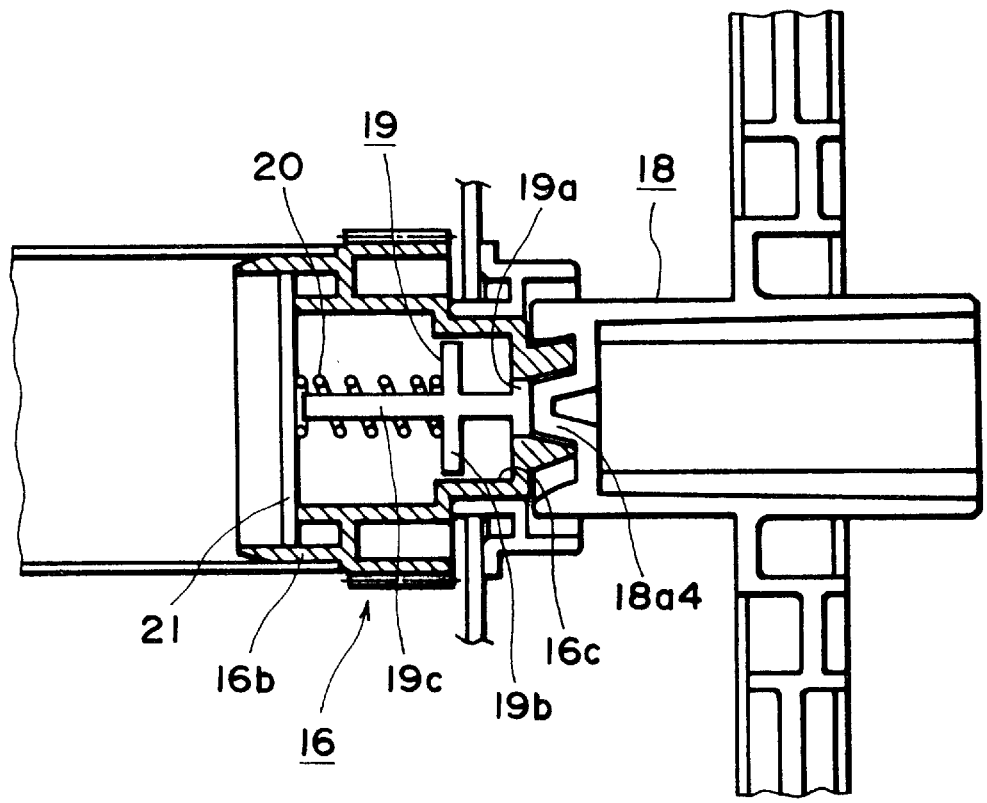
FIG. 35 is a sectional view of a male coupling projection and a recess according to a further embodiment of the present invention.

Referring to FIGS. 34 and 35, a further embodiment will be described. In this embodiment, the hole 17a2 is covered with a cap which is openable. According to this embodiment, the introduction of foreign matter into the hole 17a2 can be prevented.

The same reference numerals as in the foregoing embodiment are assigned to the elements having the corresponding functions, and detailed descriptions thereof are omitted for simplicity.

In this embodiment, a cap 19 is provided to cap the hole 17a2 in the end surface of the projection 17a. The cap 19 is provided with a cap portion 19a, a portion 19b for engagement with the inside 16c of the drum gear 16a and a portion 19c for engagement with a spring 20. The drum gear 16 is provided with a spring receptor member 21 bonded thereto by a bonding material or the like.

When the process cartridge B is not mounted to the main assembly 13 of the apparatus, the cap 19 is urged by the spring 20 as shown in FIG. 34, so that engaging portion 19b is abutted to the abutment portion 16d of the drum gear to cap the hole 17a2. When the process cartridge B is mounted to the main assembly 13, the cap portion 19a is urged in the axial direction by the projection 18a4 of the main assembly gear shaft portion 18 so that spring 20 contracts and that projection 18a4 enters the hole 17a2.

The same advantageous effects as with the forgoing embodiment are provided in the embodiment.

In the foregoing, the process cartridge has been described as a cartridge for monochromatic image formation, but it is applicable to a cartridge for forming a multi-color image (two color, three color or full-color image, for example) if a plurality of developing means are used.

As for the developing method, any known methods can be used such as a two-component magnetic brush developing method, a cascade developing method, a touch-down developing method, cloud developing method or the like.

As for the electrophotographic photosensitive member, usable ones include amorphous silicon, amorphous selenium, zinc oxide, titanium oxide, organic photoconductor (OPC) and the like. As for methods for mountings photosensitive material, a photoconductor is evaporated or painted or applied on a cylinder of aluminum alloy or the like.

As for the charging means, a so-called contact type charging method is used in the foregoing examples. However, another method such as corona charging is usable, in which a tungsten wire is enclosed by metal shield of aluminum or the like at three side of the wire, and positive or negative ions are produced by applying a high voltage to the tungsten wire, and the surface of the photosensitive drum is uniformly charged by moving positive or negative ions to the surface.

As for the charging means, blade type (charging blade), pad type, block type, rod type, wire type or the like is usable in addition to the roller type.

As for the cleaning means for removing residual toner from the photosensitive drum, fur brush, magnetic brush or the like is usable, as well as the cleaning blade.

The process cartridge may contain a photosensitive member and at least one of process means. The process cartridge may contain a photosensitive drum and charging means and is made detachably mountable to a main assembly of the apparatus. The process cartridge may contain a photosensitive drum and developing means and is made detachably mountable to a main assembly of the apparatus. The process cartridge may contain a photosensitive drum and cleaning means and is made detachably mountable to a main assembly of the apparatus. The process cartridge may contain a photosensitive drum and at least two process means.

The process cartridge may contain a photosensitive drum and charging means, developing means or cleaning means, and is made detachably mountable to a main assembly of the apparatus. The process cartridge may contain a photosensitive drum and at least one of charging means, developing means and cleaning means, and is made detachably mountable to a main assembly of the apparatus. The process cartridge may contain a photosensitive drum and at least developing means, and is made detachably mountable to a main assembly of the apparatus. Since the process cartridge is detachably mountable to the main assembly of the image forming apparatus by the user, and this means that the maintenance of the apparatus using the process cartridge can be performed by the user by exchanging the process cartridge.

The present invention is applicable to a non-cartridge type image forming apparatus wherein the photosensitive drum, the developing means or the like is directly mounted to the main assembly of the apparatus.

In the foregoing, a description has been provided as to a laser beam printer as an exemplary image forming apparatus, but the present invention is applicable to an electrophotographic copying machine, a facsimile machine, a word processor or another image forming machine.

As described in the foregoing, by the provision of the hole in the end surface of the male coupling projection, variation of the resin material temperature and/or the pressure in the mold is suppressed during manufacturing, and the contraction of the resin material is reduced, thus stabilizing the accuracy of the configuration of the projection. The member in which the recess is formed, is an integrally molded plastic material. Since the portions of the recess other than the portions contactable to the projection are arcuate along the contact portion of the female shaft, variation of the resin material temperature and/or the pressure in the mold is suppressed during manufacturing, and the contraction of the resin material is reduced, thus stabilizing the accuracy of the configuration of the recess. Therefore, non-uniformity in the rotation or rattling of the contact points due to load variation in the drive transmission or the like can be minimized, so that rotational accuracy of the photosensitive drum 7 can be further improved.

Namely, $S \geq T \geq U$ is satisfied, where S is a radial play between the male coupling projection and the recess; T is a play between the projection and the main assembly guide recess; and U is a radial play between the hole in the end surface of the projection and the projection in the recess when the male shaft and the female shaft are engaged with each other.

Therefore, even when the apparatus is transported or carried while process cartridge B is mounted in the main assembly thereof, the contact portions between the male coupling projection and the recess are not damaged.

Also, $V \geq S$ is satisfied where V is a radial play between the entrance of the hole and the free end of the projection. Therefore, when the male coupling projection and the recess are coupled, no interference occurs between the hole in the end surface of the projection and the projection in the recess.

As described in the foregoing, the entrance of the hole 17a2 and the free end of the projection 18a4 are so related that radial play is not less than the play between the projection 24a and the main assembly guide portion projection 15d, and therefore, the engagement between the projection 17a and the recess 18a is not influenced. The hole 17a2 and the projection 18a4 are so related that radial play when the male shaft 17 and the female shaft 18 are coupled with each other, is not more than the radial play between the male coupling projection 17a and the recess 18a. Therefore, even when the apparatus is transported or carried while process cartridge B is mounted in the main assembly thereof (non-drive-transmission state), the contact portions between the male coupling projection 17a and the recess 18a are not damaged (FIG. 32). More particularly, even if the vibration is imparted, the main assembly guide portion stops the projection 24a, and/or the projection 18a4 stops the hole 17a2, so that damage of the male coupling projection 17a and the recess 18a is prevented. In the process cartridge mounting direction in the direction indicated by the arrow, the projection 18a4 receives the member defining the hole 17a2, so that damage of the male coupling projection 17a and the recess 18a can be avoided.

As will be understood from the foregoing, the rotational accuracy of the drive transmission using the coupling can be enhanced, and the positioning in the axial and radial directions of the photosensitive drum shaft can be effected with high accuracy relative to the main assembly of the apparatus.

As described in the foregoing, according to the present invention, the rotation accuracy of the driving transmission is improved, so the rotation accuracy of the electrophotographic photosensitive drum has been improved.

Additionally, the driving force can be assuredly transmitted from the main assembly to the electrophotographic photosensitive drum.

Furthermore, when the driving force is transmitted (during image forming operation), the rotation center of the coupling of the main assembly of the apparatus and the coupling of the electrophotographic photosensitive drum can be substantially aligned.

Further additionally, when the driving force is transmitted (during the image forming operation), the electrophotographic photosensitive drum is attracted toward the main assembly side, so that the positional accuracy of the photosensitive member and therefore the process cartridge relative to the main assembly is improved.

Further additionally, when the driving transmission is not carried out (when the image is not formed), the drive transmission coupled state is released, so that the operativity in demounting of the process cartridge is improved. Further additionally, the diameter of the diameter of the coupling portion is small.

Additionally, according to the present invention, since the projection is provided in the recess in the projection, foreign matter is prevented from entering the recess.

Also, since the projection has a hole, the accuracy of the configuration of the projection can be improved when the projection is molded.

Furthermore, by outwardly expanding the portion of the recess not contactable to the projection during drive transmission, the accuracy of the configuration of the recess can be improved even if the recess is molded.

Furthermore, according to the present invention, since the projection is provided in the recess, and a hole is provided in the free end of the projection, the damage to the recess and the projection can be avoided, even if the apparatus is transported or carried while the apparatus is loaded with the process cartridge.

While the invention has been described with reference to the structures disclosed herein, it is not confined to the details set forth and this application is intended to cover such modifications or changes as may come within the purposes of the improvements or the scope of the following claims.

What is claimed is:

1. A process cartridge detachably mountable to a main assembly of an electrophotographic image forming apparatus, wherein said main assembly includes a motor, a rotatable driving member for receiving a driving force from said motor and a main assembly recess defined by twisted surfaces, said main assembly recess being substantially coaxial with said rotatable driving member, and a main assembly projection provided in the main assembly recess and substantially coaxial with said rotatable driving member, said process cartridge comprising:

an electrophotographic photosensitive drum;
    process means actable on said photosensitive drum;
    a twisted cartridge projection engageable with said twisted surfaces, said cartridge projection being provided at a longitudinal end of said photosensitive drum; and
    a cartridge recess provided at a free end of said cartridge projection and substantially coaxial with said cartridge projection, wherein when said process cartridge is mounted to the main assembly, said main assembly projection enters said cartridge recess;
    wherein, when said rotatable driving member rotates with said main assembly recess and cartridge projection engaged with each other, a rotational driving force is transmitted from said rotatable driving member to the photosensitive drum through engagement between said main assembly recess and said cartridge projection.

2. A process cartridge according to claim 1, wherein the cartridge recess has an inner surface which is inclined inwardly toward a deep side thereof.

3. A process cartridge according to claim 1 or 2, wherein a bottom portion of said cartridge recess has a through hole.

4. A process cartridge according to claim 1, wherein when said main assembly projection is in said cartridge recess, play is provided between said cartridge recess and said main assembly projection.

5. A process cartridge according to claim 1 or 4, wherein when the driving force is transmitted to said photosensitive drum, an inner peripheral surface of said cartridge recess does not contact an outer peripheral surface of said main assembly projection.

6. A process cartridge according to claim 1, wherein said cartridge projection has a substantially triangular prism shape.

7. A process cartridge according to claim 1, wherein said cartridge projection has a substantially equilateral triangular chamfered prism shape.

8. A process cartridge according to claim 1, further comprising a drum flange at one longitudinal end of said photosensitive drum, wherein said drum flange has a shaft for rotatably supporting said photosensitive drum on a cartridge frame, wherein said flange is integral molded with said cartridge projection.

9. A process cartridge according to claim 1, further comprising a cartridge frame having a circular outer wall partly or entirely enclosing a circumference of said cartridge projection, wherein when the process cartridge is mounted to the main assembly, the outer wall is engaged with an outer wall engaging recess in the main assembly.

10. A process cartridge according to claim 9, wherein when the driving force is not transmitted to said photosensitive drum with said process cartridge being mounted in the main assembly, the outer wall contacts the outer wall engaging recess, and a part of an inner surface of said cartridge recess contacts a part of an outer peripheral surface of said main assembly projection.

11. A process cartridge according to claim 1, wherein when the driving force is transmitted to said photosensitive drum, said cartridge projection receives a pulling force.

12. A process cartridge according to claim 1, wherein said process means includes at least charging means for charging the photosensitive drum, developing means for developing a latent image formed on said photosensitive drum, and cleaning means for removing residual toner from said photosensitive drum.

13. A process cartridge according to claim 1, wherein a surface defining said main assembly recess has a recess-enlarged portion not contacted by said cartridge projection when the driving force is transmitted to said photosensitive drum.

14. A process cartridge according to claim 13, wherein the surface of the recess-enlarged portion extends substantially along a part of a peripheral surface of a shaft in which said main assembly recess is provided.

15. A process cartridge according to claim 1, wherein an outer peripheral surface of said main assembly projection is inclined outwardly toward a base side thereof.

16. A process cartridge according to claim 1, 2, 4, 6–14 or 15, wherein amount of twisting of said cartridge projection is 1°–15° per 1 mm of axial length.

17. A process cartridge according to claim 1, 2, 4, 6–14 or 15, wherein the main assembly recess has a substantially triangular cross-section.

18. A process cartridge according to claim 1, 2, 4, 6–14 or 15, wherein said main assembly recess has a substantially equilateral triangular cross-section.

19. A process cartridge detachably mountable to a main assembly of an electrophotographic image forming apparatus, wherein said main assembly includes a motor, a rotatable driving member for receiving a driving force from said motor and a main assembly recess defined by twisted surfaces, said main assembly recess being substantially coaxial with said rotatable driving member and being provided in an end surface of a columnar shaft provided on said rotatable driving member coaxially therewith, and a main assembly projection provided in the main assembly recess and substantially coaxial with said rotatable driving member, the process cartridge comprising:

an electrophotographic photosensitive drum;

process means actable on said photosensitive drum;

a twisted cartridge projection engageable with said twisted surfaces, said cartridge projection being provided at a longitudinal end of said photosensitive drum, wherein said projection has a shape of a substantially triangular prism;

a cartridge recess provided at a free end of said cartridge projection and substantially coaxial with said cartridge projection, wherein when said process cartridge is mounted to the main assembly, said main assembly projection enters the cartridge recess, wherein, when said rotatable driving member rotates with said main assembly recess and cartridge projection engaged with each other, a rotational driving force is transmitted from said rotatable driving member to said photosensitive drum through engagement between said main assembly recess and said cartridge projection; and a drum flange at one longitudinal end of said photosensitive drum, wherein said drum flange has a shaft for rotatably supporting said photosensitive drum on a cartridge frame, wherein said flange is integrally molded with said cartridge projection.

20. A process cartridge according to claim 19, wherein the cartridge recess has an inner surface which is inclined inwardly toward a deep side thereof.

21. A process cartridge according to claim 19 or 20, wherein a bottom portion of said cartridge recess has a through hole.

22. A process cartridge according to claim 19, wherein when said main assembly projection is in said cartridge recess, play is provided between said cartridge recess and said main assembly projection.

23. A process cartridge according to claim 19 or 20, wherein when the driving force is transmitted to said photosensitive drum, an inner peripheral surface of said cartridge recess does not contact an outer peripheral surface of said main assembly projection.

24. A process cartridge according to claim 19, wherein said cartridge projection has a substantially equilateral triangular chamfered prism shape.

25. A process cartridge according to claim 19, further comprising a cartridge frame having a circular outer wall partly or entirely enclosing a circumference of said cartridge projection, wherein when said process cartridge is mounted to the main assembly, the outer wall is engaged with an outer wall engaging recess in the main assembly.

26. A process cartridge according to claim 25, wherein when the driving force is not transmitted to the photosensitive drum with the process cartridge being mounted in the main assembly, the outer wall contacts the outer wall engaging recess, and a part of an inner surface of the cartridge recess contacts a part of an outer peripheral surface of said main assembly projection.

27. A process cartridge according to claim 19, wherein when the driving force is transmitted to said photosensitive drum, the cartridge projection receives a pulling force.

28. A process cartridge according to claim 19, wherein said process means includes at least charging means for charging said photosensitive drum, developing means for developing a latent image formed on said photosensitive drum, and cleaning means for removing residual toner from said photosensitive drum.

29. A process cartridge according to claim 19, wherein an outer peripheral surface of said main assembly projection is inclined outwardly toward a base side thereof.

30. A process cartridge according to claim 19, 20, 22, 24–28 or 29, wherein amount of twisting of the cartridge projection is 1°–15° per 1 mm of axial length.

31. A process cartridge according to claim 19, 20, 22, 24–28 or 29, wherein said main assembly recess has a substantially equilateral triangular cross-section.

32. A process cartridge detachably mountable to a main assembly of an electrophotographic image forming apparatus for forming an image on a recording material, said main assembly including a motor, a driving rotatable member for receiving a driving force from said motor, and a twisted recess with an inside projection or a twisted projection with an inside recess, said twisted recess or twisted projection having a non-circular cross-section and substantially coaxial with a rotation axis of said driving rotatable member, said process cartridge comprising:

a rotatable electrophotographic photosensitive drum;

process means actable on said photosensitive drum; and a portion comprising a twisted projection with an inside recess or twisted recess with an inside projection, provided at a longitudinal end of said photosensitive drum, having a non-circular cross-section and substantially coaxial with a rotation axis of said photosensitive drum, wherein said portion of said photosensitive drum has such a dimension and configuration that it can take a first relative rotational position with respect to said twisted recess or projection of said driving rotatable member in which relative rotational movement therebetween is permitted, and a second relative rotational position with respect to said twisted recess or projection of said driving rotatable member in which relative rotational movement is prevented in one rotational direction, while the rotation axis of said driving rotatable member and the rotation axis of said photosensitive drum are substantially aligned, wherein said inside projection of said twisted recess is in said inside recess of said twisted projection when said first and second rotational positions are taken.

33. A process cartridge according to claim 32, wherein the inside recess has an inner surface which is inclined inwardly toward a deep side thereof.

34. A process cartridge according to claim 32 or 33, wherein a bottom portion of the inside recess has a through hole.

35. A process cartridge according to claim 32, wherein when the inside projection is in the inside recess, play is provided between the inside recess and the inside projection.

36. A process cartridge according to claim 32 or 35, wherein when the driving force is transmitted to the photosensitive drum, an inner peripheral surface of said inside recess does not contact an outer peripheral surface of said inside projection.

37. A process cartridge according to claim 32, wherein said twisted projection has a substantially triangular prism shape.

38. A process cartridge according to claim 32, wherein said twisted projection has a substantially equilateral triangular chamfered prism shape.

39. A process cartridge according to claim 32, further comprising a drum flange at one longitudinal end of said photosensitive drum, wherein said drum flange has a shaft for rotatably supporting said photosensitive drum on a cartridge frame, wherein said flange is integral molded with said twisted projection or twisted recess.

40. A process cartridge according to claim 32, further comprising a cartridge frame having a circular outer wall partly or entirely enclosing a circumference of said portion, wherein when said process cartridge is mounted to the main assembly, the outer wall is engaged with an outer wall engaging recess in the main assembly.

41. A process cartridge according to claim 40, wherein when the driving force is not transmitted to said photosensitive drum with said process cartridge being mounted in the main assembly, said outer wall contacts the outer wall engaging recess, and a part of an inner surface of said inside recess contacts a part of an outer peripheral surface of said inside projection.

42. A process cartridge according to claim 32, wherein when the driving force is transmitted to said photosensitive drum, said twisted projection or recess of said process cartridge receives a pulling force.

43. A process cartridge according to claim 32, wherein said process means includes at least charging means for charging said photosensitive drum, developing means for developing a latent image formed on said photosensitive drum, and cleaning means for removing residual toner from said photosensitive drum.

44. A process cartridge according to claim 32, wherein a surface defining one of said twisted recesses has a recess-enlarged portion not contacted by said twisted projection when the driving force is transmitted to said photosensitive drum.

45. A process cartridge according to claim 44, wherein the surface of the recess-enlarged portion extends substantially along a part of a peripheral surface of a shaft in which said recess is provided.

46. A process cartridge according to claim 32, wherein an outer peripheral surface of the inside projection is inclined outwardly toward a base side thereof.

47. A process cartridge according to claim 32, wherein the amount of twisting of said twisted projection is 1°–15° per 1 mm of axial length.

48. A process cartridge according to claim 32, wherein one of said twisted recesses has a substantially triangular cross-section.

49. A process cartridge according to claim 48, wherein one of said twisted recesses has a substantially equilateral triangular cross-section.

50. A drive transmission part for transmitting a driving force to an electrophotographic photosensitive drum and a developing roller for developing a latent image formed on said photosensitive drum, which are contained in a process cartridge detachably mountable to a main assembly of an electrophotographic image forming apparatus for forming an image on a recording material, said main assembly including a motor, a rotatable driving member for receiving a driving force from said motor, a twisted recess formed substantially at a center of said rotatable driving member, said recess having a polygonal cross-section, a main assembly projection provided in said recess, said drive transmission part comprising:
 a gear for transmitting a driving force received from said main assembly to said developing roller when said process cartridge is mounted to the main assembly;
 a shaft provided substantially at a center of said gear; and
 a twisted projection provided at an end of said shaft, wherein said twisted projection receives a driving force from the main assembly through engagement between said recess and projection, wherein a cartridge recess is provided in said twisted projection, wherein the driving force is transmitted to said photosensitive drum through the shaft, and is transmitted to said developing roller through said gear with said main assembly projection being in said cartridge recess.

51. A part according to claim 50, wherein the projection, gear and shaft are of integrally molded resin material.

52. A photosensitive drum, which is contained in a process cartridge detachably mountable to a main assembly of an electrophotographic image forming apparatus for forming an image on a recording material, said main assembly including a motor, a main assembly side rotatable driving member for receiving a driving force from said motor, a twisted recess formed substantially at a center of said rotatable driving member, said recess having a polygonal cross-section, and a main assembly projection provided in said recess, the photosensitive drum comprising:
 a cylinder having a photosensitive layer thereon;
 a drive transmission member mounted to an end of said cylinder, said drive transmission member including:
  a gear for transmitting a driving force received from the main assembly to a developing roller when said process cartridge is mounted to the main assembly;
  a shaft provided substantially at a center of said gear; and
  a twisted projection provided at an end of said shaft, wherein said twisted projection receives a driving force from the main assembly through engagement between said recess and twisted projection, wherein a cartridge recess is provided in said twisted projection, wherein the driving force is transmitted to said photosensitive drum through the shaft, and is transmitted to said developing roller through said gear with said main assembly projection being in said cartridge recess.

53. A part according to claim 52, wherein the projection, gear and shaft are of integrally molded resin material.

54. An electrophotographic image forming apparatus for forming an image on a recording material, to which a process cartridge is detachably mountable, comprising:
 (a) a motor;
 (b) a rotatable driving member for receiving a driving force from said motor;
 (c) a main assembly recess defined by twisted surfaces, said main assembly recess being substantially coaxial with said rotatable driving member;
 (d) a main assembly projection provided in the main assembly and substantially coaxial with said rotatable driving member;
 (e) a mounting member for detachably mounting said process cartridge, which includes:
  an electrophotographic photosensitive drum;
  process means actable on said photosensitive drum; and
  a twisted cartridge projection engageable with said twisted surfaces, said cartridge projection being provided at a longitudinal end of said photosensitive drum;
  a cartridge recess provided at a free end of said cartridge projection and substantially coaxial with said cartridge projection, wherein when said process cartridge is mounted to the main assembly, said main assembly projection enters said cartridge recess;
 wherein, when said rotatable driving member rotates with said main assembly recess and cartridge projection engaged with each other, a rotational driving force is transmitted from said rotatable driving member to said photosensitive drum through engagement between said main assembly recess and said cartridge projection; and the apparatus further comprising:

(f) feeding means for feeding the recording material.

55. An electrophotographic image forming apparatus for forming an image on a recording material, to which a process cartridge is detachably mountable, comprising:

(a) a motor;

(b) a rotatable driving member for receiving a driving force from said motor;

(c) a main assembly recess defined by twisted surfaces, said main assembly recess being substantially coaxial with said rotatable driving member and being provided in an end surface of a columnar shaft provided on said rotatable driving member coaxially therewith;

(d) a main assembly projection provided in the main assembly recess and substantially coaxial with said rotatable driving member;

(e) a mounting member for detachably mounting said process cartridge, which includes:

an electrophotographic photosensitive drum;

process means actable on said photosensitive drum; and a twisted cartridge projection engageable with said twisted surfaces, said cartridge projection being provided at a longitudinal end of said photosensitive drum, wherein said cartridge projection has a shape of a substantially triangular prism;

a cartridge recess provided at a free end of said cartridge projection and substantially coaxial with said cartridge projection, wherein when said process cartridge is mounted to the apparatus, said main assembly projection enters said cartridge recess;

wherein, when said rotatable driving member rotates with said main assembly recess and cartridge projection engaged with each other, a rotational driving force is transmitted from said rotatable driving member to said photosensitive drum through engagement between said main assembly recess and said cartridge projection;

a drum flange at one longitudinal end of said photosensitive drum, wherein said drum flange has a shaft for rotatably supporting said photosensitive drum on a cartridge frame, wherein said flange is integral molded with said cartridge projection; and the apparatus further comprising:

(f) feeding means for feeding the recording material.

56. An electrophotographic image forming apparatus for forming an image on a recording material, to which a process cartridge is detachably mountable, comprising:

(a) a motor;

(b) a driving rotatable member for receiving driving force from the motor;

(c) a twisted recess with an inside projection or a twisted projection with an inside recess, said twisted recess or projection having a non-circular cross-section and substantially coaxial with a rotation axis of said driving rotatable member;

a mounting member for detachably mounting said process cartridge, which includes:

a rotatable electrophotographic photosensitive drum;

process means actable on said photosensitive drum; and a twisted projection with an inside recess or twisted recess with an inside projection, provided at a longitudinal end of said photosensitive drum, having a non-circular cross-section and substantially coaxial with a rotation axis of said photosensitive drum, wherein the twisted projection or recess of said photosensitive drum has such a dimension and configuration that it can take a first relative rotational position with respect to said twisted recess or projection of said driving rotatable member in which relative rotational movement therebetween is permitted, and a second relative rotational position with respect to said twisted recess or projection of said driving rotatable member in which relative rotational movement is prevented in one rotational direction, while the rotation axis of said driving rotatable member and the rotation axis of said photosensitive drum are substantially aligned, wherein said inside projection of said twisted recess is in said inside recess of said twisted projection when said first and second rotational positions are taken; and said apparatus further comprising:

(f) feeding means for feeding the recording material.

57. A process cartridge according to claim 1, 19 or 32, wherein said driving rotatable member is a gear.

58. An apparatus according to claim 54, 55 or 56, wherein said driving rotatable member is a gear.

59. A process cartridge according to claim 1, 19 or 32, wherein said image forming apparatus further includes an openable member which is opened when said process cartridge is mounted or demounted relative to the image forming apparatus and further includes a movable member, wherein said movable member moves said driving rotatable member away from a mounting position of said process cartridge in an axial direction thereof in interrelation with an opening operation of said openable member, and moves said driving rotatable member toward the mounting position of said process cartridge in the axial direction thereof in interrelation with a closing operation of said openable member.

60. An apparatus according to claim 54, 55 or 56, wherein said image forming apparatus further includes an openable member which is opened when said process cartridge is mounted or demounted relative to the image forming apparatus and further includes a movable member, wherein said movable member moves said driving rotatable member away from a mounting position of said process cartridge in an axial direction thereof in interrelation with an opening operation of said openable member, and moves said driving rotatable member toward the mounting position of said process cartridge in the axial direction thereof in interrelation with a closing operation of said openable member.

61. A process cartridge detachably mountable to a main assembly of an electrophotographic image forming apparatus, wherein said main assembly includes a motor, a main assembly gear for receiving a driving force from said motor and a main assembly recess defined by twisted surfaces, said main assembly recess being substantially coaxial with said gear and being provided in an end surface of a columnar shaft provided on said gear coaxially therewith, and the main assembly recess has a substantially triangular cross-section, and a main assembly projection provided in the main assembly recess and substantially coaxial with said gear, said process cartridge comprising:

an electrophotographic photosensitive drum;

a charging member for charging said photosensitive drum;

a developing member for developing a latent image formed on said photosensitive drum;

a cleaning member for removing residual toner from said photosensitive drum;

a twisted cartridge projection engageable with said twisted surfaces, said cartridge projection being provided at a longitudinal end of said photosensitive drum, wherein said cartridge projection has a shape of a substantially triangular prism;

a cartridge recess provided at a free end of said cartridge projection and substantially coaxial with the cartridge projection, wherein when said process cartridge is mounted to the main assembly, said main assembly projection enters said cartridge recess, and said cartridge recess has an inner surface which is included inwardly toward a deep side thereof, and a bottom portion of said cartridge recess has a through hole;

wherein, when said gear rotates with said main assembly recess and cartridge projection engaged with each other, a rotational driving force is transmitted from said gear to said photosensitive drum through engagement between said main assembly recess and said cartridge projection, and a drum flange at one longitudinal end of said photosensitive drum, wherein said drum flange has a shaft for rotatably supporting said photosensitive drum on a cartridge frame, wherein said flange is integral molded with said cartridge projection.

62. A process cartridge according to claim 59, wherein said twisted projection has a substantially equilateral triangular chamfered prism shape.

63. A drive transmission part for transmitting a driving force to an electrophotographic photosensitive drum, which are contained in a process cartridge detachably mountable to a main assembly of an electrophotographic image forming apparatus for forming an image on a recording material, said main assembly including a motor, a main assembly side rotatable driving member for receiving a driving force from said motor, a twisted recess formed substantially at a center of said rotatable driving member, said recess having a polygonal cross-section, and a main assembly projection provided in said recess, said driving transmission part comprising:

a shaft; and a twisted projection provided at an end of said shaft, wherein said projection receives a driving force from the main assembly through engagement between said recess and projection, wherein a cartridge recess is provided in said twisted projection, wherein the driving force is transmitted to said photosensitive drum through the shaft with said main assembly projection being in said cartridge recess.

64. A part according to claim 63, wherein said projection and shaft are composed of integrally molded resin material.

65. A photosensitive drum, which is contained in a process cartridge detachably mountable to a main assembly of an electrophotographic image forming apparatus for forming an image on a recording material, said main assembly including a motor, a rotatable driving member for receiving a driving force from said motor, a twisted recess formed substantially at a center of said rotatable driving member, said recess having a polygonal cross-section, and a main assembly projection provided in said recess, said photosensitive drum comprising:

a cylinder having a photosensitive layer thereon;

a drive transmission member mounted to an end of said cylinder, said drive transmission member including:

a shaft; and a twisted projection provided at an end of said shaft, wherein said projection receives a driving force from the main assembly through engagement between said recess and projection, wherein a cartridge recess is provided in said twisted projection, wherein the driving force is transmitted to said photosensitive drum through the shaft with said main assembly projection being in said cartridge recess.

66. A drum according to claim 65, wherein said projection and shaft are composed of integrally molded resin material.

67. A process cartridge detachably mountable to a main assembly of an electrophotographic image forming apparatus, wherein said main assembly includes a motor, a main assembly driving gear for receiving a driving force from said motor, a main assembly recess defined by twisted surfaces, said main assembly recess being substantially coaxial with said driving gear, and a main assembly projection provided in said main assembly recess substantially coaxial with said driving gear, said process cartridge comprising:

an electrophotographic photosensitive drum;

a charging roller for charging said photosensitive drum;

a developing roller for developing a latent image formed on said photosensitive drum;

a cleaning blade for removing residual toner from said photosensitive drum;

a twisted cartridge projection engageable with said twisted surfaces, said cartridge projection being substantially triangular in cross section and provided at a longitudinal end of said photosensitive drum; and a cartridge recess provided at a free end of said cartridge projection substantially coaxial with said cartridge projection, wherein when said process cartridge is mounted to the main assembly, said main assembly projection enters said cartridge recess;

wherein, when said main assembly driving gear rotates with said main assembly recess and cartridge projection engaged with each other, a rotational driving force is transmitted from said driving gear to said photosensitive drum through engagement between said main assembly recess and said cartridge projection, and said cartridge projection is drawn into said main assembly recess.

68. A process cartridge detachably mountable to a main assembly of an electrophotographic image forming apparatus, wherein said main assembly includes a motor, a main assembly driving gear for receiving a driving force from said motor, a main assembly recess defined by twisted surfaces, said main assembly recess being substantially coaxial with said driving gear and being provided in an end surface of a columnar shaft provided on said driving gear coaxially therewith, and a main assembly projection provided in the main assembly recess substantially coaxial with said driving gear, said process cartridge comprising:

an electrophotographic photosensitive drum;

a charging roller for charging said photosensitive drum;

a developing roller for developing a latent image formed on said photosensitive drum;

a cleaning blade for removing residual toner from said photosensitive drum;

a twisted cartridge projection engageable with said twisted surfaces, said cartridge projection being provided at a longitudinal end of said photosensitive drum, wherein said projection has a shape of a substantially triangular prism;

a cartridge recess provided at a free end of said cartridge projection substantially coaxial with said cartridge projection, wherein when said process cartridge is mounted to the main assembly, said main assembly projection enters said cartridge recess, wherein, when said main assembly driving gear rotates with said main assembly recess and cartridge projection engaged with each other, a rotational driving force is transmitted from said driving gear to said photosensitive drum through engagement between said main assembly recess and said cartridge projection, and said cartridge projection is drawn into said main assembly recess; and a drum flange at one longitudinal end of said photosensitive drum, wherein said drum flange has a shaft for rotatably supporting said photosensitive drum on a cartridge frame, wherein said flange is integrally molded with said cartridge projection, wherein the cartridge frame has a circular outer wall at least partially encasing said projection, wherein when said process cartridge is mounted to the main assembly, the outer wall engages a recess in the main assembly.

69. A process cartridge detachably mountable to a main assembly of an image forming apparatus for forming an image on a recording material, said main assembly including a motor, a driving gear for receiving a driving force from said motor, and a twisted one of (i) a recess with an internally-disposed projection and (ii) a projection with an internally-disposed recess, said twisted recess or projection having a non-circular cross section substantially coaxial with a rotation axis of said driving gear, said process cartridge comprising:

a rotatable electrophotographic photosensitive drum;

a charging roller for charging said photosensitive drum;

a developing roller for developing a latent image formed on said photosensitive drum;

a cleaning blade for removing residual toner from said photosensitive drum;

a portion comprising a twisted one of (a) a projection with an internally-disposed recess and (b) a recess with an internally-disposed projection, provided at a longitudinal end of said photosensitive drum, having a non-circular cross section substantially coaxial with a rotation axis of said photosensitive drum, wherein said portion of said photosensitive drum has such a dimension and configuration that it can mate with and take a first relative rotational position with respect to said twisted recess or projection of said driving gear in which relative rotational movement therebetween is permitted, and a second relative rotational position with respect to said twisted recess or projection of said driving gear in which relative rotational movement is prevented in one rotational direction, while the rotation axis of said driving gear and the rotation axis of said photosensitive drum are substantially aligned, wherein said inside projection of said twisted recess is disposed within said inside recess of said twisted projection when said first and second rotational positions are taken.

* * * * *

UNITED STATES PATENT AND TRADEMARK OFFICE
CERTIFICATE OF CORRECTION

PATENT NO. : 6,175,706 B1
DATED : January 16, 2001
INVENTOR(S) : Watanabe et al.

It is certified that error appears in the above-identified patent and that said Letters Patent is hereby corrected as shown below:

Column 1,
Lines 17 and 18, "a" should read -- an --.
Line 23, "an" should read -- a --.
Line 25, "one" should be deleted.
Lines 29 and 34, "an" (first occurrence) should read -- a --.
Line 55, "in" (second occurrence) should be deleted.
Line 67, "a" (second occurrence) should read -- an --.

Column 2,
Lines 2, 6, 21, 28, 33 and 34, "a" should read -- an --.
Line 12, "electrophotographic" should read -- an electrophotographic --.

Column 5,
Line 40, "wherein," should read -- wherein --.

Column 6,
Line 42, "is" should read -- is a -- and "view" should read -- view of --.

Column 7,
Line 26, "a one" should read -- an --.
Line 46, "and" should read -- an --.
Line 54, "Preferred embodi-" should be deleted.
Line 55, "ments of the present invention" should be deleted.

Column 8,
Line 32, "Fig." should read -- Figs. --.

Column 9,
Line 32, "in" should be deleted.
Line 33, "contact" should read -- in contact --.
Line 44, "an" should read -- a --.
Line 50, "is" should read -- are -- and "15a" should read -- 15a, --.

Column 10,
Line 28, "fixed" should read -- fixed to --.
Line 58, "Fig. 8," should read -- Figs. 8 --.

Column 11,
Line 7, "view," should read -- view --.
Line 20, "shows" should read -- show --.

UNITED STATES PATENT AND TRADEMARK OFFICE
CERTIFICATE OF CORRECTION

PATENT NO. : 6,175,706 B1
DATED : January 16, 2001
INVENTOR(S) : Watanabe et al.

It is certified that error appears in the above-identified patent and that said Letters Patent is hereby corrected as shown below:

Column 12,
Line 12, "to," should read -- to --.

Column 13,
Line 59, "18a 4" should read -- 18a4 --.

Column 14,
Line 34, "16" should read -- 16 is --.

Column 16,
Line 43, "at a" should read -- at an --.
Line 50, "Fig." (first occurrence) should read -- Figs. -- and "to Fig." should read -- - --.

Column 18,
Line 1, "matches" should read -- match --.
Line 61, "of a" should read -- of an --.

Column 19,
Line 42, "material" (first occurrence) should be deleted.
Line 60, "$G>f\geq t$." should read -- $G>f\geq C$. --

Column 20,
Line 34, "with" should read -- (with --.
Line 55, "21 example," should read -- 21, for example, --

Column 21,
Lines 52 and 53, "is" should read -- are --.

Column 23,
Line 45, "7 is" should read -- 7, which is --.
Line 46, "16" should read -- 16, --.
Line 47, "views" should read -- viewed --.
Line 52, "of" should read -- to -- and "f" should read -- of --.

Column 24,
Line 16, "motor" should read -- the motor --.
Line 43, "are" should read -- is --.

UNITED STATES PATENT AND TRADEMARK OFFICE
CERTIFICATE OF CORRECTION

PATENT NO.    : 6,175,706 B1
DATED         : January 16, 2001
INVENTOR(S)   : Watanabe et al.

It is certified that error appears in the above-identified patent and that said Letters Patent is hereby corrected as shown below:

<u>Column 25,</u>
Line 24, "photosensitive-drum" should read -- photosensitive drum --.

<u>Column 26,</u>
Line 53, "spring" should read -- the spring --.
Line 54, "projection" should read -- the projection --.
Line 55, "forgoing" should read -- foregoing --.

<u>Column 27,</u>
Line 4, "mountings" should read -- mounting --
Line 11, "metal" should read -- a metal --.
Line 12, "side" should read -- sides --.
Line 45, "and" should be deleted.

<u>Column 29,</u>
Line 9, "the diameter of" (second occurrence) should be deleted.

<u>Column 30,</u>
Line 18, "integral" should read -- integrally --.

<u>Column 33,</u>
Line 3, "integral" should read -- integrally --.

<u>Column 34,</u>
Line 14, "main assembly side" should be deleted.

<u>Column 35,</u>
Line 46, "integral" should read -- integrally --.

UNITED STATES PATENT AND TRADEMARK OFFICE
CERTIFICATE OF CORRECTION

PATENT NO. : 6,175,706 B1
DATED : January 16, 2001
INVENTOR(S) : Watanabe et al.

It is certified that error appears in the above-identified patent and that said Letters Patent is hereby corrected as shown below:

Column 37,
Line 25, "integral" should read -- integrally --.
Line 35, "main assembly side" should be deleted.

Signed and Sealed this

Twenty-ninth Day of April, 2003

JAMES E. ROGAN
*Director of the United States Patent and Trademark Office*